United States Patent
Horiuchi et al.

(10) Patent No.: US 9,320,022 B2
(45) Date of Patent: Apr. 19, 2016

(54) TRANSMISSION APPARATUS, RECEIVEING APPARATUS, TRANSMISSION METHOD, AND RECEIVING METHOD FOR MAPPING CONTROL SIGNALS TO DIFFERENT RESOURCE REGIONS WITHIN THE SAME RESOURCE BLOCK

(75) Inventors: Ayako Horiuchi, Kanagawa (JP); Akihiko Nishio, Osaka (JP); Masayuki Hoshino, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 254 days.

(21) Appl. No.: 14/000,409

(22) PCT Filed: Apr. 13, 2012

(86) PCT No.: PCT/JP2012/002563
§ 371 (c)(1),
(2), (4) Date: Aug. 20, 2013

(87) PCT Pub. No.: WO2012/147295
PCT Pub. Date: Nov. 1, 2012

(65) Prior Publication Data
US 2013/0329684 A1 Dec. 12, 2013

(30) Foreign Application Priority Data
Apr. 27, 2011 (JP) ................................. 2011-099473

(51) Int. Cl.
*H04W 72/04* (2009.01)
*H04L 5/00* (2006.01)
(Continued)

(52) U.S. Cl.
CPC ......... *H04W 72/0406* (2013.01); *H04L 5/0044* (2013.01); *H04L 5/0053* (2013.01);
(Continued)

(58) Field of Classification Search
CPC ............ H04W 72/04; H04W 72/0406; H04W 72/0446; H04W 72/1263; H04W 72/14; H04L 5/0053; H04L 5/0044; H04L 5/0048; H04L 5/0051; H04L 5/0091; H04L 5/1469; H04L 1/0023; H04L 1/0027
See application file for complete search history.

(56) References Cited

U.S. PATENT DOCUMENTS

2008/0013599 A1\* 1/2008 Malladi ................. H04L 5/0007 375/132
2011/0044391 A1\* 2/2011 Ji et al. .......................... 375/260
(Continued)

FOREIGN PATENT DOCUMENTS

EP 2373105 A1 10/2011
WO 2010/073702 A1 7/2010

OTHER PUBLICATIONS

Supplementary European Search Report for Application No. 12776302.7-1851/2704497 dated Sep. 8, 2014.
(Continued)

*Primary Examiner* — Hoang-Chuong Vu
(74) *Attorney, Agent, or Firm* — Pearne & Gordon LLP

(57) ABSTRACT

In a base station (100), when the number of layers employed is 1 and the employed antenna port and the antenna port used for transmitting the allocation control signal are the same, a transmission controller (102) sets a first data resource region inside a first resource region, in a resource block group (RBG), that can be used for the control channel or the data channel. When the number of layers employed is 1 and the employed antenna port and the antenna port used for transmitting the allocation control signal are different, a transmission controller (102) sets a second data resource region inside the first resource region in the RBG. The second data resource region is larger than the first data resource region.

11 Claims, 19 Drawing Sheets

(51) Int. Cl.
  *H04W 72/12* (2009.01)
  *H04W 72/14* (2009.01)
  *H04L 5/14* (2006.01)

(52) U.S. Cl.
  CPC ......... *H04W72/1263* (2013.01); *H04L 5/0023* (2013.01); *H04L 5/0051* (2013.01); *H04L 5/0091* (2013.01); *H04L 5/1469* (2013.01); *H04W 72/14* (2013.01)

(56) References Cited

U.S. PATENT DOCUMENTS

| | | | |
|---|---|---|---|
| 2011/0222503 A1 | 9/2011 | Nakao et al. | |
| 2012/0250642 A1* | 10/2012 | Qu et al. | 370/329 |
| 2012/0327916 A1* | 12/2012 | Ahn | H04L 1/1854 370/336 |
| 2013/0039284 A1* | 2/2013 | Marinier et al. | 370/329 |
| 2013/0242853 A1* | 9/2013 | Seo et al. | 370/315 |

OTHER PUBLICATIONS

Panasonic, Resource allocation schemes of R-PDCCH, 3GPP TSG RAN WG1 #62bis, R1-105499, Oct. 2010, pp. 1-7.
ZTE, The mapping schemes of R-PDCCH, TSG-RAN WG1 #61, R1-102915, May 2010, pp. 1-5.
3GPP TS 36.216 V10.1.0 (Dec. 2010) Physical layer for relaying operation.
International Search Report for PCT/JP2012/002563 dated Jul. 17, 2012.

* cited by examiner

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7 - 8, $n_{SCID}=0$ |
| 1 | 1 layer, port 7, $n_{SCID}=1$ | 1 | 2 layers, ports 7 - 8, $n_{SCID}=1$ |
| 2 | 1 layer, port 8, $n_{SCID}=0$ | 2 | 3 layers, ports 7 - 9 |
| 3 | 1 layer, port 8, $n_{SCID}=1$ | 3 | 4 layers, ports 7 - 10 |
| 4 | 2 layers, ports 7 - 8 | 4 | 5 layers, ports 7 - 11 |
| 5 | 3 layers, ports 7 - 9 | 5 | 6 layers, ports 7 - 12 |
| 6 | 4 layers, ports 7 - 10 | 6 | 7 layers, ports 7 - 13 |
| 7 | Reserved | 7 | 8 layers, ports 7 - 14 |

FIG. 4

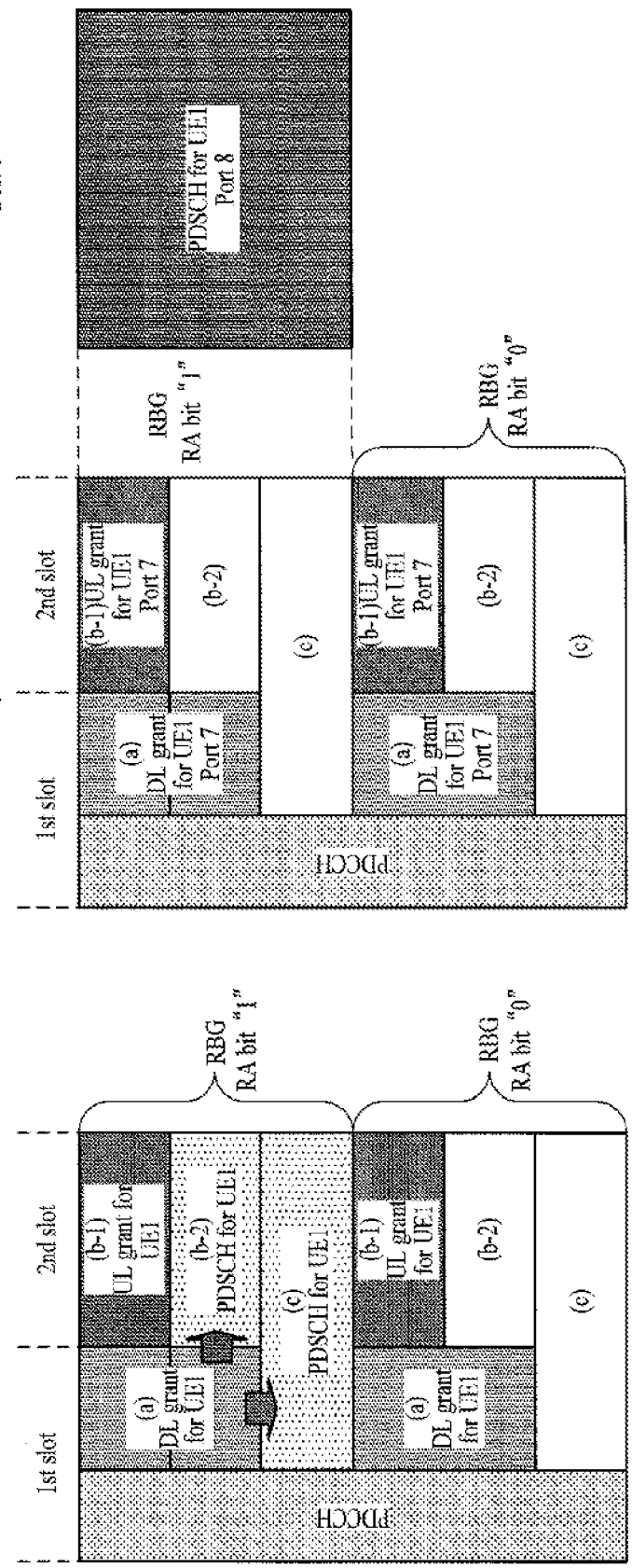

TRANSMISSION APPARATUS, RECEIVEING APPARATUS, TRANSMISSION METHOD, AND RECEIVING METHOD FOR MAPPING CONTROL SIGNALS TO DIFFERENT RESOURCE REGIONS WITHIN THE SAME RESOURCE BLOCK

TECHNICAL FIELD

The present invention relates to a transmission apparatus, a reception apparatus, a transmission method, and a reception method.

BACKGROUND ART

In recent years, it has become common to transmit large-volume data, such as still image data and moving image data in addition to audio data in cellular mobile communication systems, in response to spread of multimedia information. Active studies associated with techniques for achieving a high transmission rate in a high-frequency radio band have been conducted to achieve large-volume data transmission.

When a high frequency radio band is utilized, however, attenuation increases as the transmission distance increases, although a higher transmission rate can be expected within a short range. Accordingly, the coverage area of a radio communication base station apparatus (hereinafter, abbreviated as "base station") decreases when a mobile communication system using a high frequency radio band is actually put into operation. Thus, more base stations need to be installed in this case. The installation of base stations involves reasonable costs, however. For this reason, there has been a high demand for a technique that provides a communication service using a high-frequency radio band, while limiting an increase in the number of base stations.

In order to meet such a demand, studies have been carried out on a relay technique in which a radio communication relay station apparatus (hereinafter, abbreviated as "relay station") is installed between a base station and a radio communication mobile station apparatus (hereinafter, abbreviated as "mobile station") to perform communication between the base station and mobile station via the relay station for the purpose of increasing the coverage area of each base station. The use of relay technique allows a mobile station not capable of directly communicating with a base station to communicate with the base station via a relay station.

An LTE-A (long-term evolution advanced) system for which the introduction of the relay technique described above has been studied is required to maintain compatibility with LTE (long term evolution) in terms of a smooth transition from and coexistence with LTE. For this reason, mutual compatibility with LTE is required for the relay technique as well.

FIG. 1 illustrates example frames in which control signals and data are assigned in the LTE system and the LTE-A system.

In the LTE system, a DL (downlink) control signal from a base station to a mobile station is transmitted through a DL control channel, such as a PDCCH (physical downlink control channel). In LTE, a DL grant indicating DL data assignment and a UL (uplink) grant indicating UL data assignment are transmitted through a PDCCH. A DL grant reports that a resource in the subframe in which the DL grant is transmitted has been allocated to the mobile station. Meanwhile, in an FDD system, a UL grant reports that a resource in the fourth subframe after the subframe in which the UL grant is transmitted has been allocated to the mobile station. In a TDD system, UL grant reports that the resource in a subframe transmitted after four or more subframes from the subframe in which the UL grant is transmitted has been allocated to the mobile station. In the TDD system, the subframe to be assigned to the mobile station, or the number of subframes before the assigned subframe in which the UL grant is transmitted is determined in accordance with the time-division pattern of the UL and DL (hereinafter referred to as "UL/DL configuration pattern"). Regardless of the UL/DL configuration pattern, the UL subframe is a subframe after at least four subframes from the subframe in which the UL grant is transmitted.

In the LTE-A system, relay stations, in addition to base stations, also transmit control signals to mobile stations in PDCCH regions in the top parts of subframes. With reference to a relay station, DL control signals have to be transmitted to a mobile station. Thus, the relay station switches the processing to reception processing after transmitting the control signals to the mobile station to prepare for receiving signals transmitted from the base station. The base station, however, transmits a DL control signal to the relay station at the time the relay station transmits the DL control signal to the mobile station. The relay station therefore cannot receive the DL control signal transmitted from the base station. In order to avoid such inconvenience in the LTE-A, studies have been carried out on providing a region in which downlink control signals for relay stations are located (i.e., relay PDCCH (R-PDCCH) region) in a data region. Similar to the PDCCH, placing a DL grant and UL grant on the R-PDCCH is studied. In the R-PDCCH, as illustrated in FIG. 1, placing a DL grant in the first slot and a UL grant in the second slot is studied (refer to Non-patent Literature 1). Placing the DL grant in the first slot reduces a delay in decoding the DL grant, and allows relay stations to prepare for ACK/NACK transmission for DL data (transmitted in the fourth subframe following reception of a DL grant in FDD). Each relay station finds the downlink control signal intended for the relay station by performing blind-decoding on downlink control signals transmitted using R-PDCCH from a base station within a resource region indicated using higher layer signaling from the base station (i.e., search space).

As described above, the base station notifies the relay station of the search space corresponding to the R-PDCCH by higher layer signaling. Notification of the search space corresponding to the R-PDCCH may be performed in two different ways: (1) notification using a PRB (physical resource block) pair as a single unit; or (2) notification using an RBG (resource block group) as a single unit. The term, "PRB (physical resource block) pair" refers to a set of PRBs in the first and second slots, whereas the term, "PRB" refers to an individual PRB in either the first or second slot. Hereinafter, a PRB pair may simply be referred to as "PRB." A resource block group (RBG) is a unit used when a plurality of PRBs are allocated as a group. The size of an RBG is determined on the basis of the bandwidth of the communication system.

An R-PDCCH has four aggregation levels, i.e., levels 1, 2, 4, and 8 (for example, refer to Non-patent Literature (hereinafter, abbreviated as "NPL" 1). Levels 1, 2, 4, and 8 respectively have six, six, two, and two mapping candidate positions. The term "mapping candidate position" refers to a candidate region to which a control signal is to be mapped. When a single terminal is configured with one aggregation level, control signals are actually mapped to one of the multiple mapping candidate positions of the aggregation level. FIG. 2 illustrates example search spaces corresponding to an R-PDCCH. The ovals represent search spaces at various aggregation levels. The multiple mapping candidate positions in the search spaces at the different aggregation levels are continuous on VRBs (virtual resource blocks). The mapping candidate positions in the VRBs are mapped to PRBs (physical resource blocks) through higher layer signaling.

Furthermore, when the base station transmits a DL grant in the R-PDCCH region directed to the relay station and assigns a PDSCH in RBG units to the relay station, the DL grant and PDSCH may be placed on the same RBG in a given subframe. That is, as shown by the top RBG in FIG. 3, when a DL grant is mapped to region (a) of a given RBG, regions (b) and (c) in the given subframe are allocated to PDSCHs by the DL grant. RBG is formed of M (M is a natural number equal to or greater than two) PRB pairs. Region (a) is in a first PRB pair allocated to the DL grant (i.e., "allocated PRB" pair), in a first slot other than the PDCCH region. Region (b) belongs to a second slot in the allocated PRB pair and is provided as a search space for a UL grant. Region (c) resides among the M PRB pairs, which form the RBG including the allocated PRB pair, in a region excluding the allocated PRB pair and the PDCCH region. As shown on the side of the top RBG in FIG. 3, if the PDSCH is allocated to the RBG, the value of the resource allocation bit (RA bit) for the RBG is "1" in the DL grant.

In a case where DL and UL grants are mapped to the same RBG in a given subframe, the DL grant is mapped to region (a), and the UL grant is mapped to region (b), as shown by RBG in the middle of FIG. 3. Regions (b) and (c) are not allocated to PDSCH. In such a case, zero is assigned to the value of the resource allocation bit included in the DL grant. Thus, a terminal that receives a DL control signal can determine whether the resource allocation as the RBG at the top in FIG. 3 or as the RBG in the middle of FIG. 3 is performed depending on the value, i.e., zero or one, of the resource allocation bit in the DL grant intended for the terminal for each RBG.

In a case where a DL grant and a UL grant are mapped to the same RBG in a given subframe, as shown by the RBG at the bottom in FIG. 3, if the value of the resource allocation bit for the RBG included in the DL grant is assumed to be "1," the UL grant and the PDSCH that are allocated to the same resource collide with each other. To avoid such collision, the base station sets the value of the resource allocation bit to zero when mapping the UL grant.

CITATION LIST

Non-Patent Literature

NPL 1
3GPP TS36.216 V10.1.0, "Physical layer for relaying operation"

SUMMARY OF INVENTION

Technical Problem

Given the introduction of various apparatuses as radio communication terminals in the future M2M (machine to machine) communication, for example, there is a concern for a shortage of resources in the mapping region for PDCCHs (i.e., "PDCCH regions") due to an increase in the number of terminals. If a PDCCH cannot be mapped due to such a resource shortage, the DL data cannot be assigned for the terminals. Thus, the resource region to which DL data is mapped (i.e., "PDSCH (physical downlink shared channel) region") cannot be used even if there is an available region, which causes a possible decrease in the system throughput. Studies have been carried out to solve such resource shortage through placing control signals for terminals served by a base station in the data region to which an R-PDCCH is mapped (i.e., "R-PDCCH region for terminals"). Placing the control signals in a data region in such a manner enables transmission power control for control signals transmitted to terminals near a cell edge or interference control for interference to another cell by control signals to be transmitted or interference to the cell from another cell.

The search space corresponding to the R-PDCCH for terminals is a resource region to which the control signals transmitted from the base station to the terminals may be mapped. Moreover, the search space corresponding to the R-PDCCH is configured for each terminal.

Similar to the R-PDCCH region for a relay station, in an R-PDCCH region for terminals, when the base station transmits the DL grant and allocates the PDSCH in RBG units to a terminal, the DL grant and the PDSCH may be placed on the same RBG in a given subframe. In a case where the DL grant and PDSCH are placed on the same RBG, region (a) is excluded as a resource for the PDSCH, while regions (b) and (c) are allocated to the PDSCH as resources.

For this reason, the resource amount for PDSCH differs between a case where the DL grant and the PDSCH are placed on the same RBG in a given subframe, and a case where the DL grant and the UL grant are mapped to a given RBG in a given subframe.

Furthermore, depending on the method for PDSCH assignment by the DL grant described above, when the DL grant and the UL grant are mapped to a given RBG in a given subframe, the PDSCH cannot be assigned to the given RBG.

An object of the present invention is to provide a transmitting apparatus, a receiving apparatus, a transmission method, and a reception method that enable, even when a first allocation control signal of a first data resource in a first communication direction and a second allocation control signal of a second data resource in a second communication direction in bidirectional communication are mapped within the same resource block group, an increase in the resource amount of the first data resource while avoiding collision between the second allocation control signal and the signal mapped to the first data resource in the resource block group.

Solution to Problem

A transmitting apparatus according to an aspect of the present invention is a transmitting apparatus that maps a control signal for a receiving apparatus to a first resource region usable for both a control channel and a data channel or a second resource region usable for a control channel and transmits the mapped control signal, and maps transmission data to a data resource region and transmits the mapped transmission data to the receiving apparatus, the transmitting apparatus including: a generating section that generates an allocation control signal for the data resource region; a setting section that sets a first data resource region within the first resource region in a resource block group (RBG) composed of M (M is a natural number equal to or greater than two) resource blocks (RBs), when the number of streams used to transmit the transmission data is one and an antenna port used to transmit the transmission data is identical to the antenna port used to transmit the allocation control signal, and the setting section sets a second data resource region larger than the first data resource region within the first resource region in the RBG when the number of streams used to transmit the transmission data is one and the antenna port used to transmit the transmission data is different from the antenna port used to transmit the allocation control signal; and a mapping section that maps the transmission data to the set data resource region and maps the allocation control signal to the control resource region.

A receiving apparatus according to an aspect of the present invention is a receiving apparatus that receives a received signal including a control signal transmitted from a transmitting apparatus in a first resource region usable for both a control channel and a data channel or a second resource region usable for a control channel and receives transmission data mapped to a data resource region and transmitted from the transmitting apparatus, the receiving apparatus including: a detection section that detects an allocation control signal for the data resource region included in the received signal; an identifying section that identifies a first data resource region within the first resource region in a resource block group (RBG) composed of M (M is a natural number equal to or greater than two) resource blocks (RBs) as a data component region to be extracted, when the number of streams used to transmit the transmission data is one and an antenna port used to transmit the transmission data is identical to the antenna port used to transmit the allocation control signal; and the identifying section that identifies a second data resource region larger than the first data resource region within the first resource region in the RBG as the data component region to be extracted, when the number of streams used to transmit the transmission data is one and the antenna port used to transmit the transmission data is different from the antenna port used to transmit the allocation control signal; and an extracting section that extracts from the received signal, a signal component within the identified data component region to be extracted.

A transmission method according to an aspect of the present invention is a transmission method that maps a control signal for a receiving apparatus to a first resource region usable for both a control channel and a data channel or a second resource region usable for a control channel, then transmits the mapped control signal, and maps transmission data to a data resource region and transmits the mapped transmission data to the receiving apparatus, the method including: generating an allocation control signal for the data resource region; setting a first data resource region within the first resource region in a resource block group (RBG) composed of M (M is a natural number equal to or greater than two) resource blocks (RBs), when the number of streams used to transmit the transmission data is one and an antenna port used to transmit the transmission data is identical to the antenna port used to transmit the allocation control signal; setting a second data resource region larger than the first data resource region within the first resource region in the RBG when the number of streams used to transmit the transmission data is one and the antenna port used to transmit the transmission data is different from the antenna port used to transmit the allocation control signal; and mapping the transmission data to the set data resource region and mapping the allocation control signal to the control resource region.

A reception method according to an aspect of the present invention is a reception method that receives a received signal including a control signal transmitted from a transmitting apparatus in a first resource region usable for both a control channel and a data channel or a second resource region usable for a control channel and receives transmission data mapped to a data resource region and transmitted from the transmitting apparatus, the method including: detecting an allocation control signal for the data resource region included in the received signal; identifying a first data resource region within the first resource region in a resource block group (RBG) composed of M (M is a natural number equal to or greater than two) resource blocks (RBs) as a data component region to be extracted, when the number of streams used to transmit the transmission data is one and an antenna port used to transmit the transmission data is identical to the antenna port used to transmit the allocation control signal; identifying a second data resource region larger than the first data resource region within the first resource region in the RBG as the data component region to be extracted, when the number of streams used to transmit the transmission data is one and the antenna port used to transmit the transmission data is different from the antenna port used to transmit the allocation control signal; and extracting, from the received signal, a signal component within the identified data component region to be extracted.

Advantageous Effects of Invention

The present invention can provide a transmitting apparatus, a receiving apparatus, a transmission method, and a reception method that enable, even when a first allocation control signal of a first data resource in a first communication direction and a second allocation control signal of a second data resource in a second communication direction in bidirectional communication are mapped within the same resource block group, an increase in the resource amount of the first data resource while avoiding collision between the second allocation control signal and the signal mapped to the first data resource in the resource block group.

BRIEF DESCRIPTION OF DRAWINGS

FIG. 4 is a diagram illustrating an LTE-A system setting table;

FIGS. 18A and B are diagrams provided for describing PDSCH allocation method 5 by DL grant;

DESCRIPTION OF EMBODIMENTS

Figure 1:
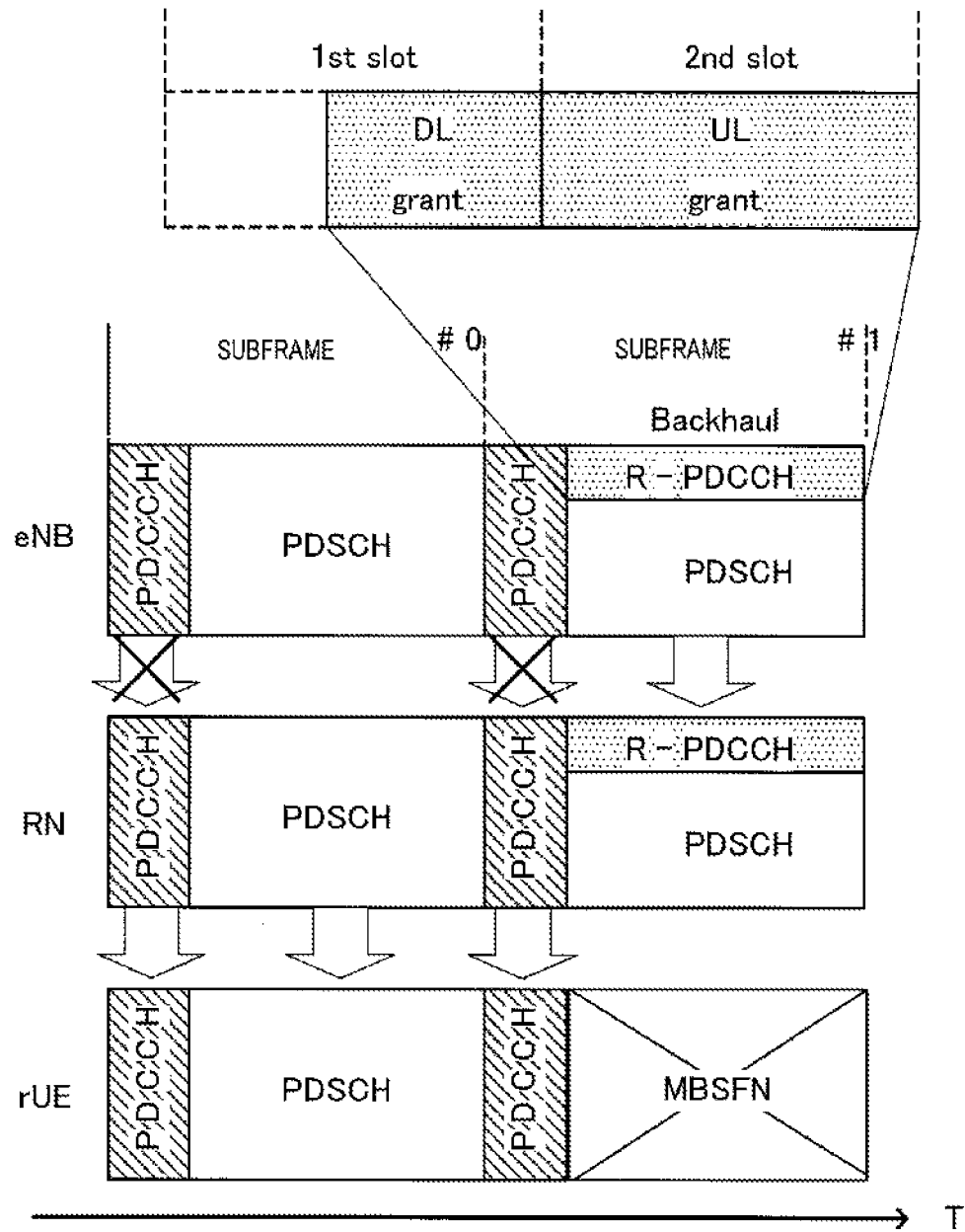
FIG. 1 illustrates example frames in which control signals and data are assigned in the LTE system and the LTE-A system.
Figure 2:
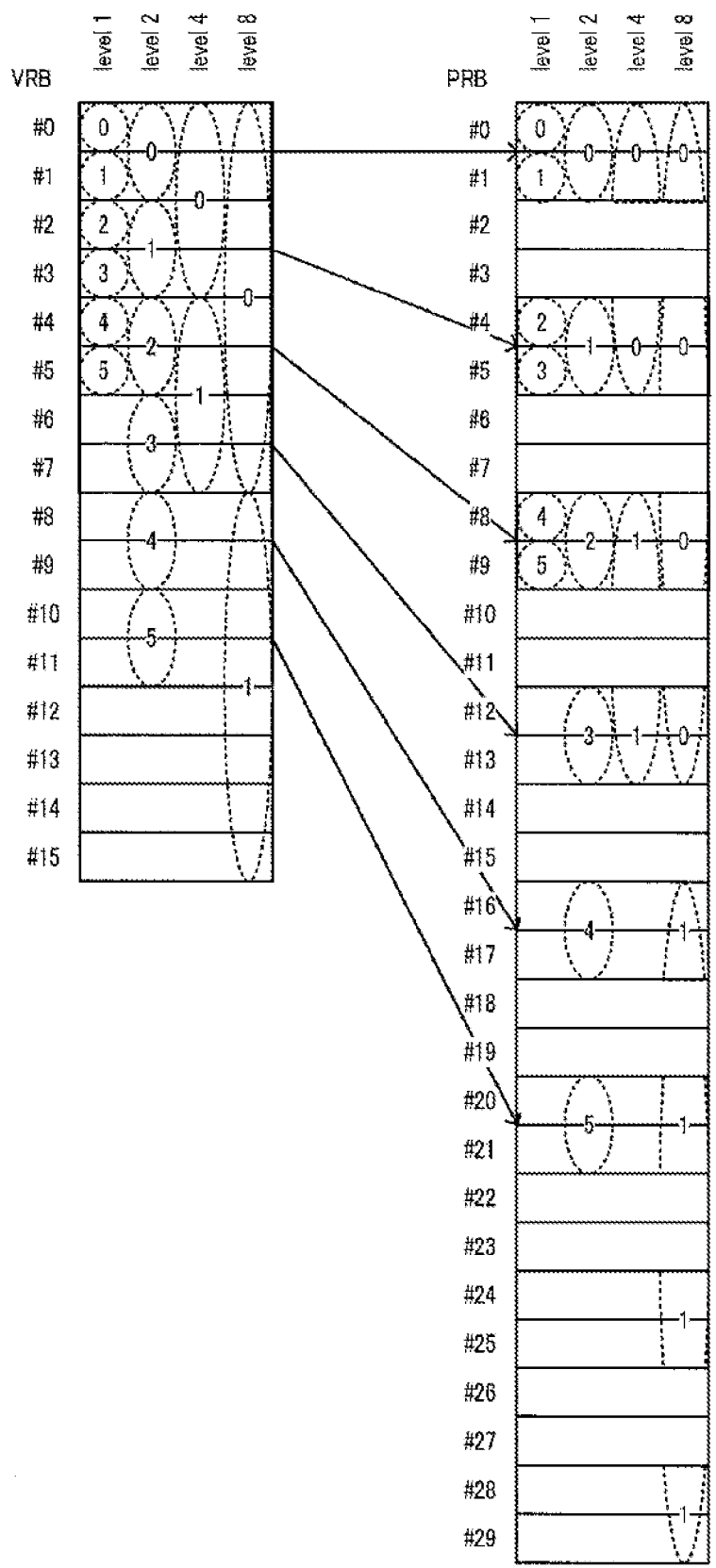
FIG. 2 illustrates example search spaces corresponding to R-PDCCH.
Figure 3:
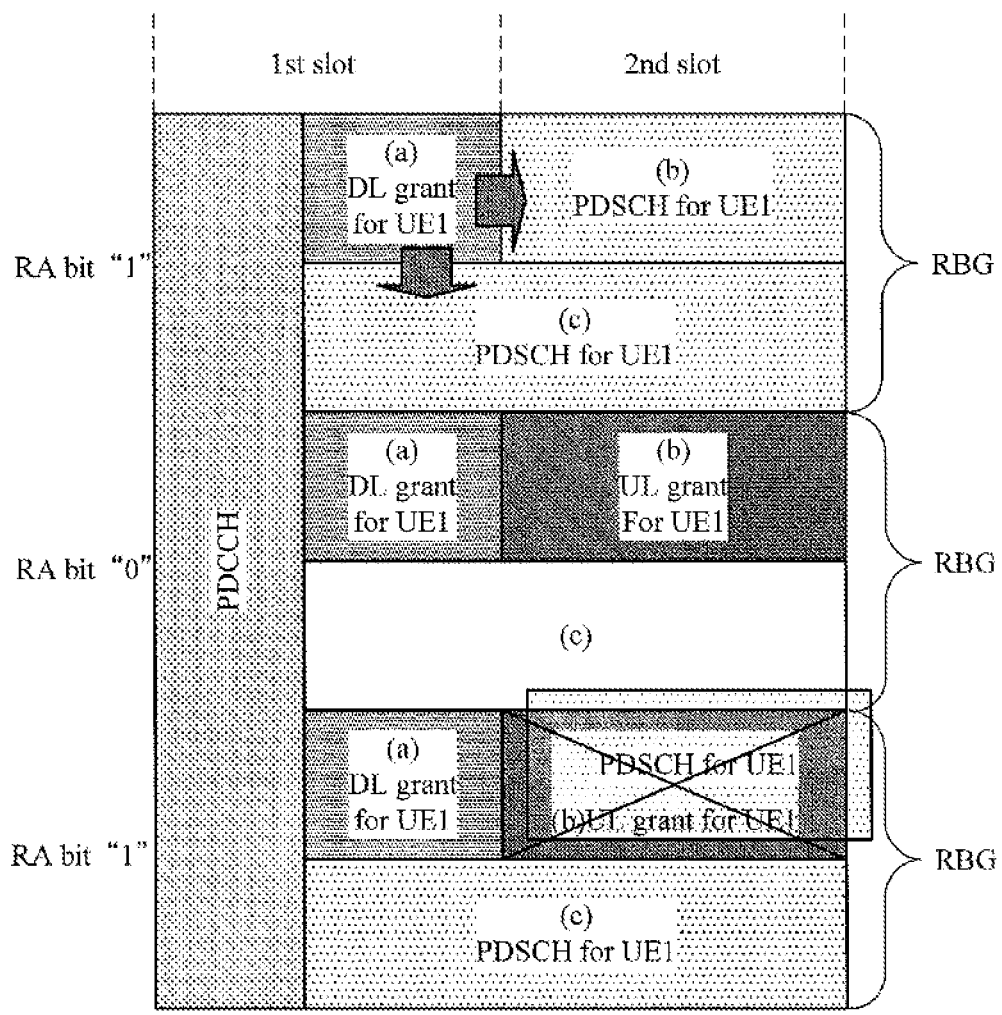
FIG. 3 is a diagram provided for data resource allocation for a relay station.

In an LTE-A system, an antenna port used for DM-RS transmission is determined based on the number of layers per UE used for DL data transmission and a setting table (see FIG. 4). A DM-RS (demodulation reference signal) is used for channel estimation of DL data (that is, PDSCH). DL data and a DM-RS are transmitted from the same antenna port. This enables channel estimation using the DM-RS. Here, the layer corresponds to a stream which is often used to describe MIMO communication.

In the LTE-A system, a DL grant is transmitted from antenna port 7. As is apparent from FIG. 4, when the number of layers per UE used for DL data transmission is one, antenna port 7 or antenna port 8 is used for DL data transmission. Furthermore, when the number of layers per UE used for DL data transmission is two or more, the same number of antenna ports as layers are used for DL data transmission in ascending order of the antenna port number from antenna port 7. When, for example, the number of layers is four, antenna ports 7, 8, 9 and 10 are used.

That is, in the LTE-A system, a DL grant is transmitted from a reference antenna port. When the number of layers per UE used for DL data transmission is one, the reference antenna port and the second antenna port are antenna ports used for DL data transmission. Furthermore, when the number of layers per UE used for DL data transmission is two, the same number of antenna ports as layers are used for DL data transmission in a predetermined order from the reference antenna port. That is, when the number of layers per UE used for DL data transmission is two, the reference antenna port is always used for DL data transmission.

The present inventor et al. discovered that when DL data intended for one UE is transmitted by one layer and transmitted from an antenna port different from the antenna port to which the DL grant indicating the resource allocated to the DL data is mapped, there is a degree of freedom in data resource allocation.

The present inventor et al. came up with the present invention by focusing attention on this degree of freedom.

Embodiments of the present invention will be described in detail with reference to the drawings. In the embodiments, the same elements will be assigned the same reference numerals, and any duplicate description of the elements is omitted.

Embodiment 1

Overview of Communication System

A communication system according to Embodiment 1 of the present invention includes a transmitting apparatus and a receiving apparatus. Specifically, in this embodiment of the present invention, a description will be provided while the transmitting apparatus is referred to as base station 100, and the receiving apparatus is referred to as terminal 200. The communication system is an LTE-A system, for example. Base station 100 is an LTE-A base station, and terminal 200 is an LTE-A terminal, for example.

Figure 5:
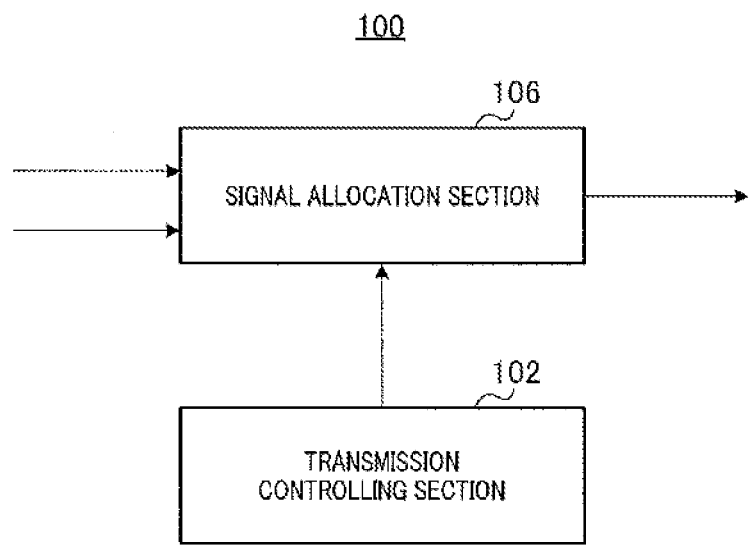
FIG. 5 is a main configuration diagram of a base station according to Embodiment 1 of the present invention.

FIG. 5 illustrates a main configuration of base station 100 according to Embodiment 1 of the present invention. Base station 100 transmits a control signal for terminal 200 after mapping the control signal to a first resource region usable for a control channel or a data channel (R-PDCCH for a terminal, in this case) or in a second resource region usable for a control channel (a PDCCH, in this case). Furthermore, base station 100 transmits transmission data to terminal 200 after mapping the transmission data to a data resource region. Transmission controlling section 102 sets a data resource region and a control resource region to which an allocation control signal is mapped within the first resource region in a resource block group (RBG) composed of M (M is a natural number equal to or greater than 2) resource blocks (RBs) based on the number of streams and antenna ports used to transmit transmission data, and antenna ports used to transmit the allocation control signal. Signal allocation section 106 maps the transmission data to the set data resource region and maps the allocation control signal to the control resource region.

When the number of streams used to transmit transmission data is one and the antenna port used to transmit transmission data is identical to the antenna port used to transmit an allocation control signal, transmission controlling section 102 sets the first data resource region in the first resource region in the RBG. Furthermore, when the number of streams used to transmit transmission data is one and the antenna port used to transmit transmission data is different from the antenna port used to transmit the allocation control signal, transmission controlling section 102 sets the second data resource region in the first resource region in the RBG.

The second data resource region is larger than the first data resource region.

Figure 6:
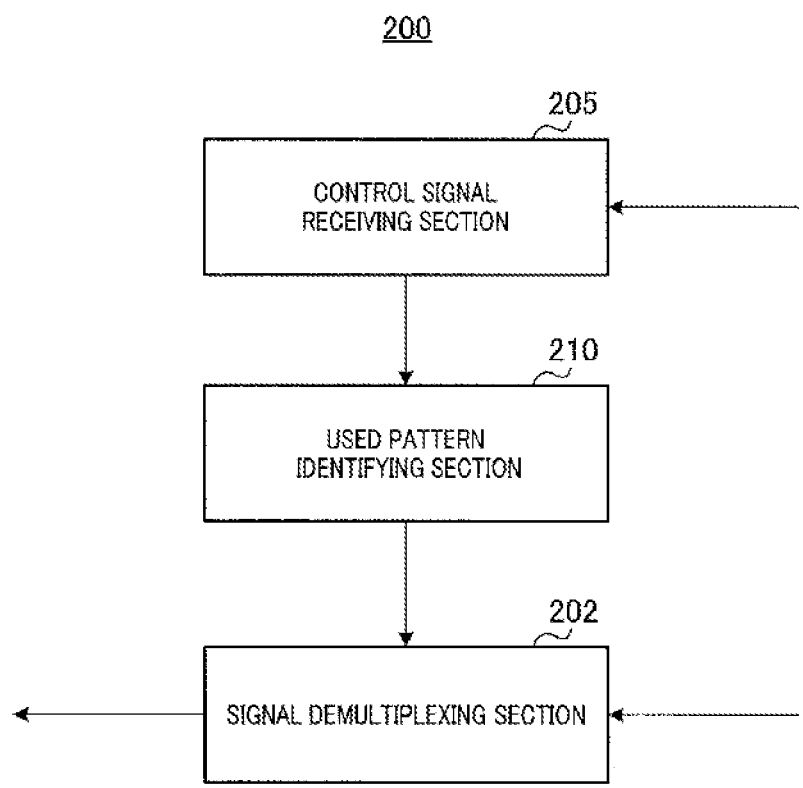
FIG. 6 is a main configuration diagram of a terminal according to Embodiment 1 of the present invention.

FIG. 6 is a main configuration diagram of terminal 200 according to Embodiment 1 of the present invention. Terminal 200 receives a received signal including a control signal (DL grant, in this case) transmitted from base station 100 in the first resource region (R-PDCCH for a terminal, in this case) or the second resource region (PDCCH, in this case). Furthermore, terminal 200 receives data mapped to the data resource region and transmitted from base station 100. Control signal receiving section 205 detects an allocation control signal for the data resource region included in the received signal. Used pattern identifying section 210 identifies a data component region to be extracted corresponding to the data resource region in a resource block group (RBG) composed of M (M is a natural number equal to or greater than 2) RBs including resource block (RB) in which an allocation control signal is detected based on the number of streams and antenna ports used to transmit data included in the detected allocation control signal and the antenna port used to transmit the allocation control signal. Signal demultiplexing section 202 extracts a signal component in the identified data component region to be extracted from the received signal.

When the number of streams used to transmit transmission data is one and the antenna port used to transmit the transmission data is the identical to the antenna port used to transmit the allocation control signal, used pattern identifying section 210 identifies the first data resource region as a data component region to be extracted. On the other hand, when the number of streams used to transmit transmission data is one and the antenna port used to transmit the transmission data is different from the antenna port used to transmit the allocation control signal, used pattern identifying section 210 identifies the second data resource region as a data component region to be extracted.

The second data resource region is greater than the first data resource region.

(Configuration of Base Station 100)

Figure 7:
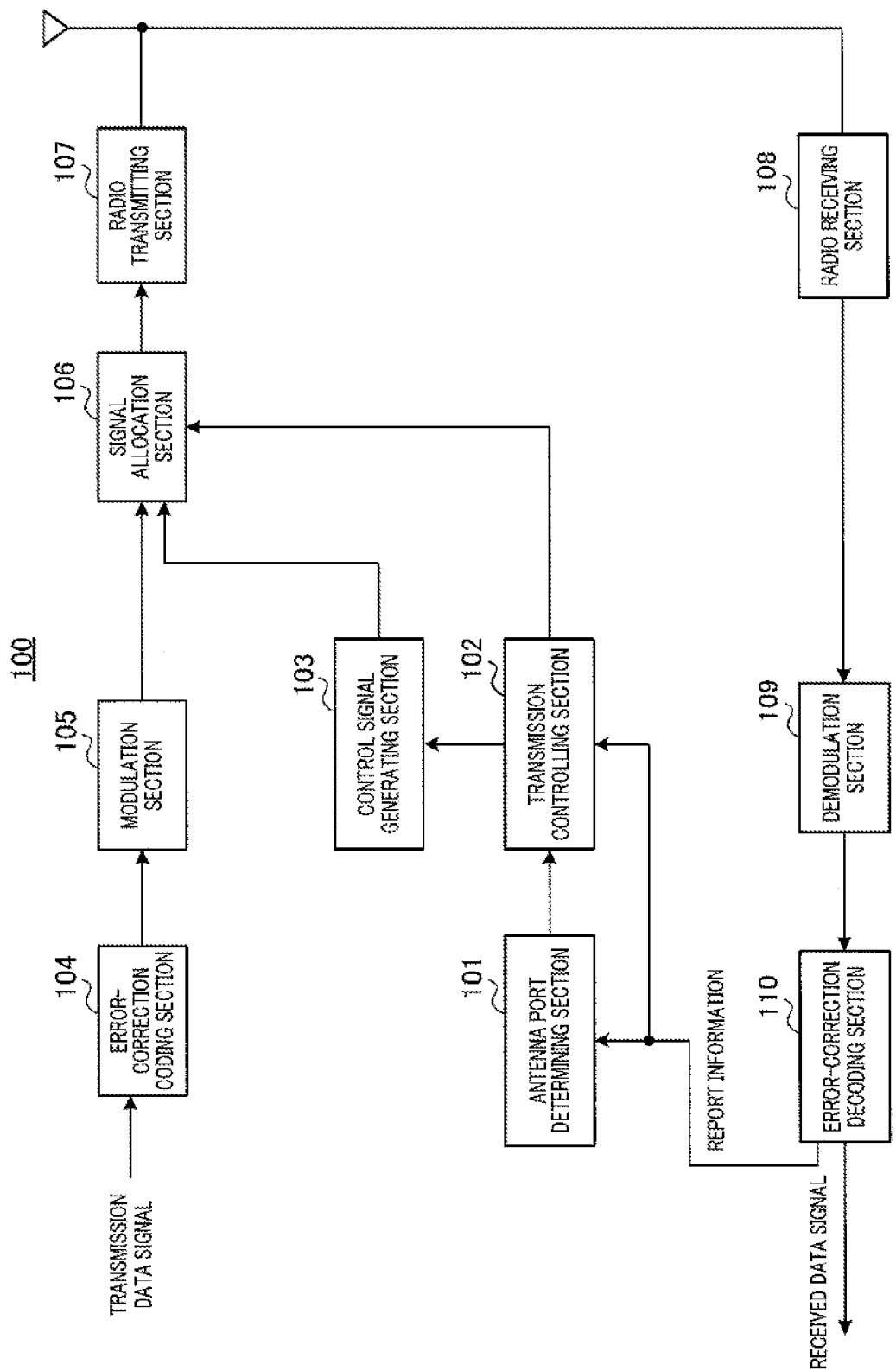
FIG. 7 is a block diagram illustrating a configuration of the base station according to Embodiment 1 of the present invention.

FIG. 7 is a block diagram illustrating a configuration of base station 100 according to Embodiment 1 of the present invention. In FIG. 7, base station 100 includes antenna port determining section 101, transmission controlling section 102, control signal generating section 103, error-correction coding section 104, modulation section 105, signal allocation section 106, radio transmitting section 107, radio receiving section 108, demodulation section 109, and error-correction decoding section 110.

Antenna port determining section 101 receives "report information" transmitted from terminal 200 as input. The "report information" includes reports on channel quality, scheduling request or buffer state or the like transmitted from terminal 200.

Antenna port determining section 101 determines an antenna port used to transmit a data signal which is a resource allocation target and the number of layers based on the report information. The determined antenna port to be used and number of layers to be used are outputted to transmission controlling section 102. Hereinafter, the antenna port to be used and the number of layers to be used may be generically called "antenna port information."

Here, a DL grant is transmitted from a reference antenna port. When the number of layers to be used is one, the antenna port to be used is the reference antenna port or a second antenna port. On the other hand, when the number of layers to be used is two, the same number of antenna ports as the number of layers is allocated as antenna ports to be used in a predetermined order from the reference antenna port. That is, when the number of layers to be used is two, the reference antenna port is always allocated as an antenna port to be used.

When there is a data signal to be transmitted, transmission controlling section 102 receives the antenna port information outputted from determining section 101 as input. Transmission controlling section 102 determines a "mapping resource pattern to be used" of a control signal and a data signal based on the antenna port information and outputs information on the determined mapping resource pattern to signal allocation section 106.

Figures 8A, 8B:
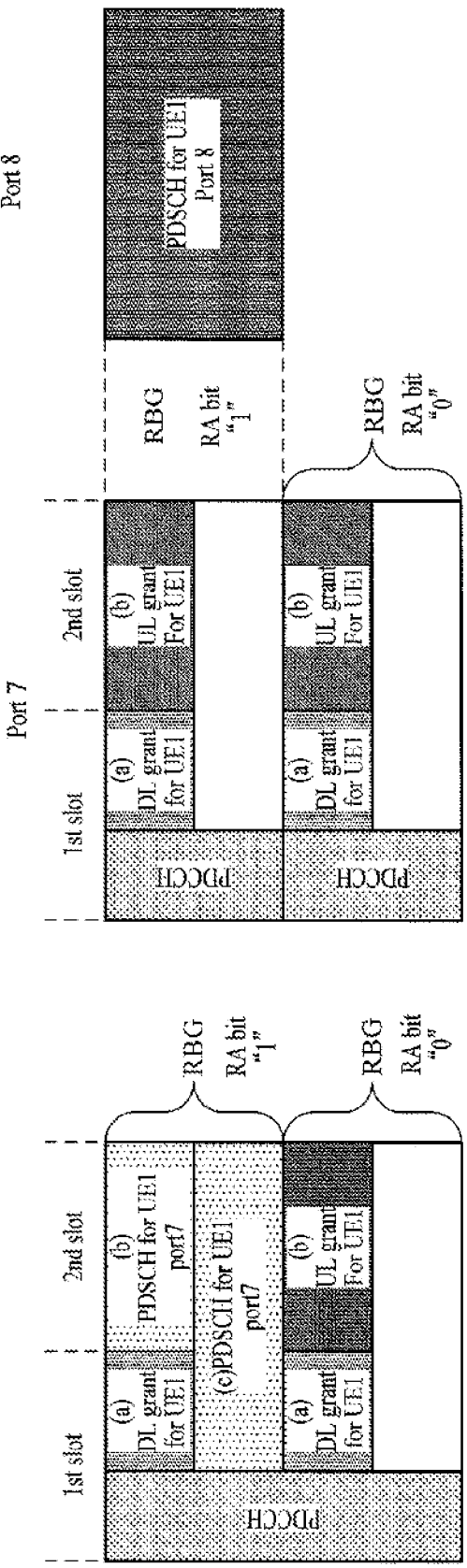
FIGS. 8A and B are diagrams provided for describing a mapping resource pattern used.

To be more specific, when the number of layers to be used is one and the antenna port to be used is a reference antenna port, transmission controlling section 102 determines mapping pattern 1 (see FIG. 8A) in which only regions (b) and (c) are allocated to data resources as the mapping resource pattern to be used. FIGS. 8A and B particularly show transmission subframes when RBG size M is 2. Furthermore, when the number of layers to be used is one and the antenna port to be used is a second antenna port other than the reference antenna port, transmission controlling section 102 determines mapping resource pattern 2 (see FIG. 8B) in which regions (a), (b) and (c) are all allocated to data resources as the mapping resource pattern to be used.

Upon reception of the antenna port information, transmission controlling section 102 outputs a DL-grant generation instruction together with the antenna port information to control-signal generating section 103. In a case where the received "report information" contains an allocation request for the UL data signal, transmission controlling section 102 determines the resource for mapping the UL grant and outputs information on the resource to signal allocation section 106 while outputting a UL-grant generation instruction to control-signal generating section 103.

Upon reception of a DL grant generation instruction together with the antenna port information, control signal generating section 103 generates DL grant including the antenna port information. To be more specific, control signal generating section 103 specifies a bit value corresponding to the antenna port information based on the antenna port information and the setting table and generates a DL grant containing the bit value. The DL grant generated in this way is outputted to signal allocation section 106.

Upon reception of the UL-grant generation instruction, control-signal generating section 103 generates and sends a UL grant to signal allocation section 106.

Error-correction coding section 104 receives a transmission data signal, performs error-correction coding on the received transmission data signal, and outputs the coded transmission data signal to modulation section 105.

Modulation section 105 modulates the signal received from error-correction coding section 104 and outputs the modulated transmission data signal to signal allocation section 106.

Signal allocation section 106 maps the DL grant received from control-signal generating section 103 and the modulated transmission data signal received from modulation section 105 to the resource based on the mapping resource pattern received from transmission controlling section 102. Signal allocation section 106 maps the UL grant received from control-signal generating section 103 to the resource indicated by the information on the mapping resource for the UL grant received from transmission controlling section 102. Such mapping of the transmission data signal and the control signal to predetermined resources generates a transmission signal. The transmission signal is outputted to radio transmitting section 107.

Radio transmitting section 107 performs radio transmission processing such as up-conversion on an input signal and transmits the processed signal via an antenna.

Radio receiving section 108 receives a signal transmitted from terminal 200 via the antenna, performs radio processing such as down-conversion on the received signal, and outputs the processed signal to demodulation section 109.

Demodulation section 109 demodulates the input signal and outputs the demodulated signal to error-correction decoding section 110.

Error-correction decoding section 110 decodes the input signal to obtain the report information and received data signal from terminal 200. The obtained report information from terminal 200 is outputted to antenna port determining section 101 and transmission controlling section 102. The received data signal is transmitted to the subsequent functional component.

(Configuration of Terminal 200)

Figure 9:
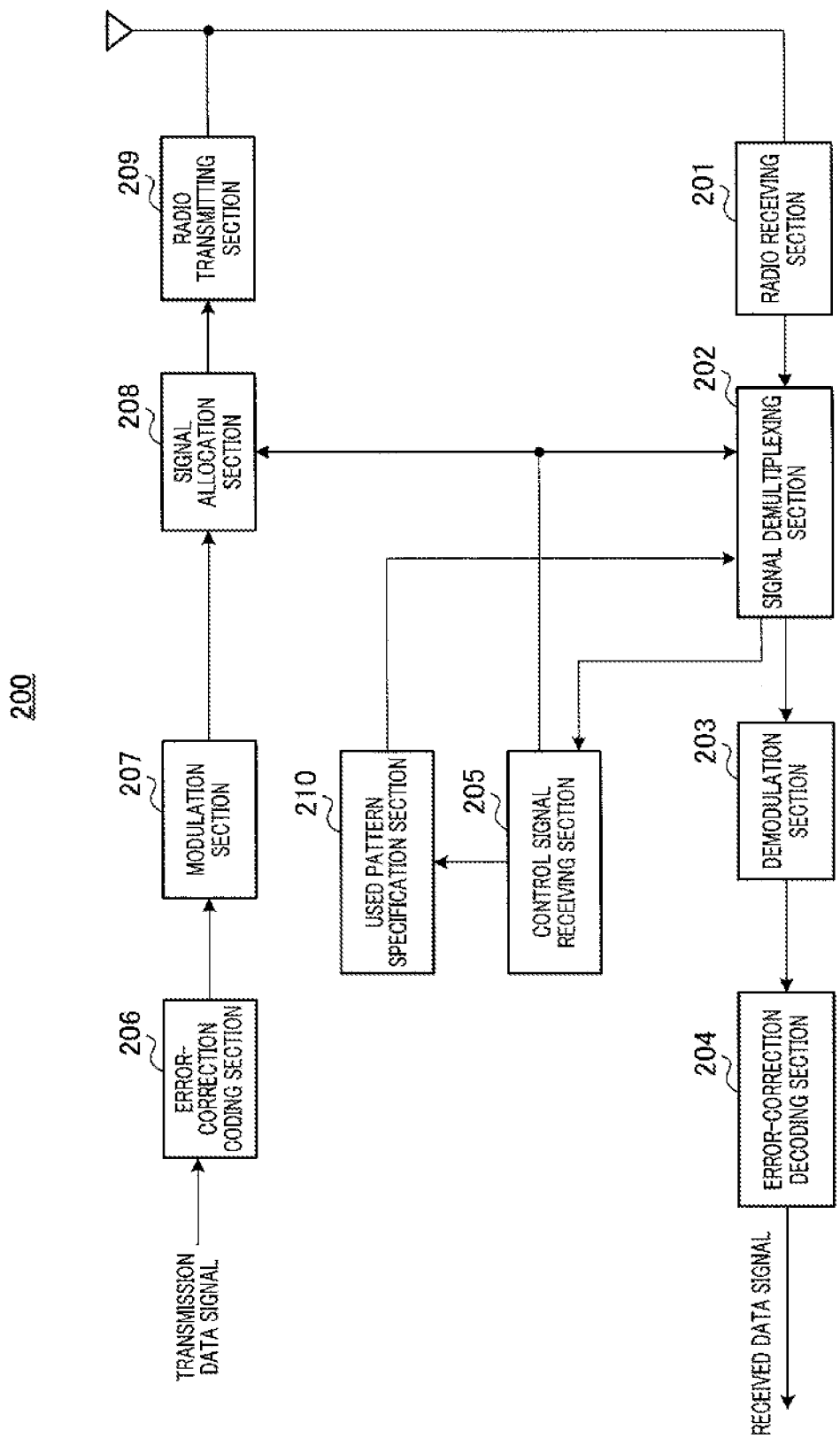
FIG. 9 is a block diagram illustrating a configuration of the terminal according to Embodiment 1 of the present invention.

FIG. 9 is a block diagram illustrating a configuration of terminal 200 according to Embodiment 1 of the present invention. In FIG. 9, terminal 200 includes radio receiving section 201, signal demultiplexing section 202, demodulation section 203, error-correction decoding section 204, control signal receiving section 205, error-correction coding section 206, modulation section 207, signal allocation section 208, radio transmitting section 209, and used pattern identifying section 210.

Radio receiving section 201 receives, via an antenna, a signal transmitted from base station 100, performs radio processing such as down-conversion on the received signal, and outputs the processed signal to signal demultiplexing section 202.

Signal demultiplexing section 202 outputs the signal received from radio receiving section 201 to control-signal receiving section 205.

Signal demultiplexing section 202 extracts a signal component corresponding to the data resource indicated by the information on the mapping resource pattern from control-signal receiving section 205 (i.e., signal component corresponding to the DL data signals) from the received signal and outputs the extracted signal to demodulation section 203.

Demodulation section 203 demodulates the signal from signal demultiplexing section 202 and outputs the demodulated signal to error-correction decoding section 204.

Error-correction decoding section 204 decodes the demodulated signal outputted from demodulation section 203 and outputs the decoded received data signal.

Control-signal receiving section 205 extracts a signal component corresponding to the R-PDCCH region from the received signal to be received from signal demultiplexing section 202 and performs blind decoding on the extracted signal component to detect the control signal (DL or UL grant) intended for terminal 200. As described above, since the DL grant includes antenna port information (more specifically, a bit value corresponding to the antenna port information).

Control-signal receiving section 205 outputs the detected UL grant to signal allocation section 208.

Used pattern identifying section 210 identifies the mapping resource pattern to be used based on the antenna port information included in the DL grant detected in control signal receiving section 205 and outputs the information on the identified mapping resource pattern to be used to signal demultiplexing section 202. This mapping resource pattern to be used is the same as that used in base station 100.

Error-correction coding section 206 uses the transmission data signal as input, performs error-correction coding on the transmission data signal, and outputs the coded signal to modulation section 207.

Modulation section 207 modulates the signal outputted from error-correction coding section 206 and outputs the modulated signal to signal allocation section 208.

Signal allocation section 208 maps the signal outputted from modulation section 207, in accordance with the UL grant to be received from control-signal receiving section 205 and outputs the mapped signal to radio transmitting section 209.

Radio transmitting section 209 performs radio transmission processing such as up-conversion on the input signal and transmits the processed signal via an antenna.

(Operations of Base Station 100 and Terminal 200)

Operations of base station 100 and terminal 200 respectively having the above described configurations will be described.

In base station 100, transmission controlling section 102 determines a mapping resource pattern to be used for a control signal and a data signal based on the antenna port information.

To be more specific, when the number of layers to be used is one and the antenna port to be used is a reference antenna port, transmission controlling section 102 determines mapping pattern 1 (see FIG. 8A) in which only regions (b) and (c) are allocated to data resources as the mapping resource pattern to be used. The information on the determined mapping resource pattern is outputted to signal allocation section 106.

When the number of layers to be used is one and the antenna port to be used is a second antenna port other than the reference antenna port, transmission controlling section 102 determines mapping resource pattern 2 (see FIG. 8B) in which regions (a), (b) and (c) are all allocated to data resources as the mapping resource pattern to be used.

The information on the determined mapping resource pattern is outputted to signal allocation section 106.

Control signal generating section 103 generates a DL grant including the antenna port information and outputs the DL grant to signal allocation section 106.

Signal allocation section 106 maps the DL grant from control signal generating section 103 and the modulated transmission data signal from modulation section 105 to the resource based on mapping resource pattern 1 to be received from transmission controlling section 102. The mapping of such transmission data signal and control signal to a predetermined resource generates a transmission signal. The transmission signal is then transmitted to terminal 200.

Control-signal receiving section 205 in terminal 200 extracts a signal component corresponding to the R-PDCCH region from the received signal to be received from signal demultiplexing section 202 and performs blind decoding on the extracted signal component to detect the control signal (DL or UL grant) intended for terminal 200.

Used pattern identifying section 210 identifies the mapping resource pattern to be used based on the antenna port information included in the DL grant detected in control signal receiving section 205.

To be more specific, when the number of layers to be used is one and the antenna port to be used is a reference antenna port, used pattern identifying section 210 identifies mapping pattern 1 in which only regions (b) and (c) are allocated to data resources as the mapping resource pattern to be used.

On the other hand, when the number of layers to be used is one and the antenna port to be used is a second antenna port other than the reference antenna port, used pattern identifying section 210 identifies mapping resource pattern 2 in which regions (a), (b) and (c) are all allocated to data resources as the mapping resource pattern to be used.

The information on the identified mapping resource pattern to be used is outputted to signal demultiplexing section 202.

Signal demultiplexing section 202 extracts a signal component corresponding to the data resource indicated by the information on the mapping resource pattern to be used outputted from control signal receiving section 205 (that is, the signal component corresponding to the downlink data signal) from the received signal and outputs the extracted signal to demodulation section 203.

The description so far is based on the assumption that the reference antenna port is identical to the antenna port used to transmit DL grant and when the number of layers is equal to or greater than two, the same number of antenna ports to be used as the number of layers is used in order from the reference antenna, but the present invention is not limited to this.

According to the embodiment described above, base station 100 maps a control signal for terminal 200 to a first resource region usable for a control channel or a data channel (R-PDCCH for a terminal, in this case) or to a second resource region usable for a control channel (PDCCH, in this case) and transmits the mapped signal. Furthermore, base station 100 maps transmission data to a data resource region and transmits the mapped transmission data to terminal 200. Transmission controlling section 102 configures the data resource region and a control resource region to which an allocation control signal is mapped in the first resource region in a resource block group (RBG), which is formed of M resource blocks (RBs) (where M is a natural number equal to or greater than two). Transmission controlling section 102 makes this setting based on the number of layers to be used, the antenna port to be used, and the antenna port to be used to transmit the allocation control signal (DL grant, in this case) for the data resource region.

When the number of layers to be used is one and the antenna port to be used is identical to the antenna port used to transmit an allocation control signal, transmission controlling section 102 sets the first data resource region in the first resource region in an RBG. On the other hand, when the number of layers to be used is one and the antenna port to be used is different from the antenna port used to transmit an allocation control signal, transmission controlling section 102 sets the second data resource region in the first resource region in the RBG.

The second data resource region is greater than the first data resource region.

In this way, when the number of layers to be used is one and the antenna port to be used is identical to the antenna port used to transmit an allocation control signal, the first data resource region can be set while avoiding a resource to which a UL grant is mapped. Furthermore, in this way, when the number of layers to be used is one and the antenna port to be used is different from the antenna port used to transmit an allocation control signal, the second data resource region including a resource to which a UL grant is mapped can be set. That is, even when a DL grant and UL grant are mapped to the same RBG, it is possible to avoid collision between the UL grant and downlink data. Furthermore, the second data resource region can be made to be greater than the first data resource region. That is, the resource amount of the second data resource region can be increased.

Limiting the target for which the resource amount is increased to the second data resource region makes it possible to achieve consistency with the condition that the resource amount of the data resource region applicable when the number of layers to be used is equal to or greater than two is equal among layers. This makes it possible to prevent the reception circuit of terminal 200 from becoming more complicated.

Particularly in Embodiment 1, as described above, the second data resource region includes all regions (a), (b) and (c). That is, the second data resource region is the whole first resource region in the RBG.

This makes it possible to set the data resource region in an RBG having good channel quality to which a control signal is mapped.

Embodiment 2

Embodiment 2 is an embodiment when the number of layers to be used is equal to or greater than two. Since a base station and a terminal according to Embodiment 2 are similar to base station 100 and terminal 200 according to Embodiment 1, the base station and terminal will be described with reference to FIGS. 7 and 9.

In base station 100 of Embodiment 2, when the number of layers to be used is equal to or greater than two, transmission controlling section 102 sets a data resource region in the whole first resource region in an RBG so as to overlap with a control resource region.

When the number of layers to be used is equal to or greater than two, signal allocation section 106 punctures transmission data corresponding to a portion of the data resource region that overlaps with the control resource region and then maps the punctured transmission data to a portion of the data resource region that does not overlap with the control resource region. This transmission data is transmission data that forms a stream transmitted from the same antenna port as the antenna port used to transmit DL grant.

FIGS. 10A to E are diagrams illustrating operations of transmission controlling section 102 and signal allocation section 106 in Embodiment 2.

Figure 10C:
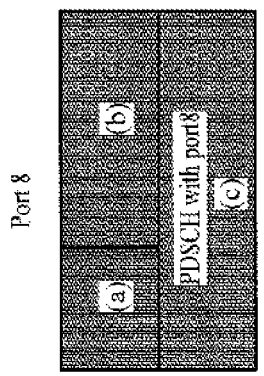
FIGS. 10A to E are diagrams provided for describing operation of a transmission controlling section and a signal allocation section according to Embodiment 2.
Figure 10B:
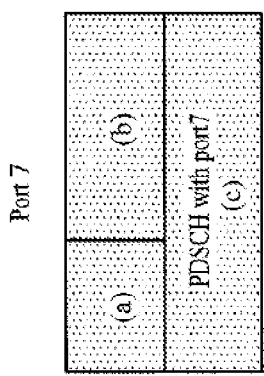
Figure 10E:
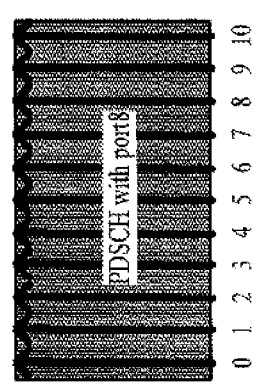
Figure 10D:
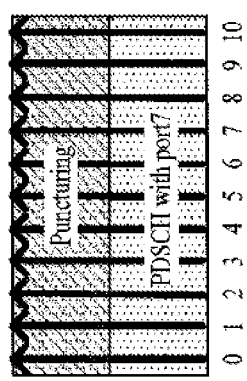
Figure 10A:
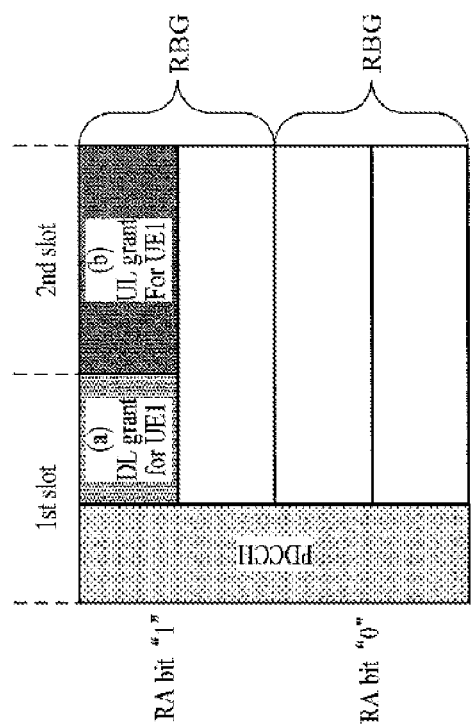

FIG. 10A shows a mapping situation of an allocation control signal in a first resource region corresponding to a reference antenna port (Port 7) of an RBG. In FIG. 10A, a DL grant is mapped to region (a) in the RBG, and a UL grant is mapped to region (b).

FIG. 10B shows a situation of the data resource region in the first resource region corresponding to the reference antenna port (Port 7) of the RBG. FIG. 10C shows a situation of the data resource region in the first resource region corresponding to an antenna port (Port 8) other than the reference antenna port (Port 7) of the RBG. That is, in both FIGS. 10B and C, the whole second resource region of the RBG is allocated as the data resource region.

FIGS. 10D and E are diagrams provided for describing puncturing processing by signal allocation section 106. As shown in FIG. 10D, the transmission data which makes up a stream transmitted from the same antenna port as the antenna port used to transmit DL grant and UL grant, and which is planned to be transmitted from a portion of the data resource region that overlaps with the control resource region is punctured. That is, the position (RE: resource element) at which data actually transmitted is mapped remains unchanged when the data is punctured and when not punctured.

On the other hand, as shown in FIG. 10D, transmission data making up a stream transmitted from an antenna port different from the antenna port used to transmit a DL grant and UL grant is not punctured.

As described above, according to the present embodiment, when the number of layers to be used is equal to or greater than two, transmission controlling section 102 in base station 100 sets a data resource region over the entire first resource region in the RBG so as to overlap with the control resource region. When the number of layers to be used is equal to or greater than two, signal allocation section 106 punctures the transmission data corresponding to the portion of the data resource region that overlaps with the control resource region and then maps the punctured transmission data to the portion of the data resource region that does not overlap with the control resource region. This transmission data is the transmission data that makes up a stream transmitted from the same antenna port as the antenna port used to transmit DL grant.

This makes it possible to satisfy the condition which is applied when the number of layers to be used is equal to or greater than two and which is that the resource amount of the data resource region is the same among layers. Furthermore, puncturing prevents the transmission data corresponding to the portion of the data resource region that overlaps with the control resource region from being actually transmitted and thereby eliminates the necessity for changing the configuration on the receiving side.

Embodiment 3

Figure 11B:
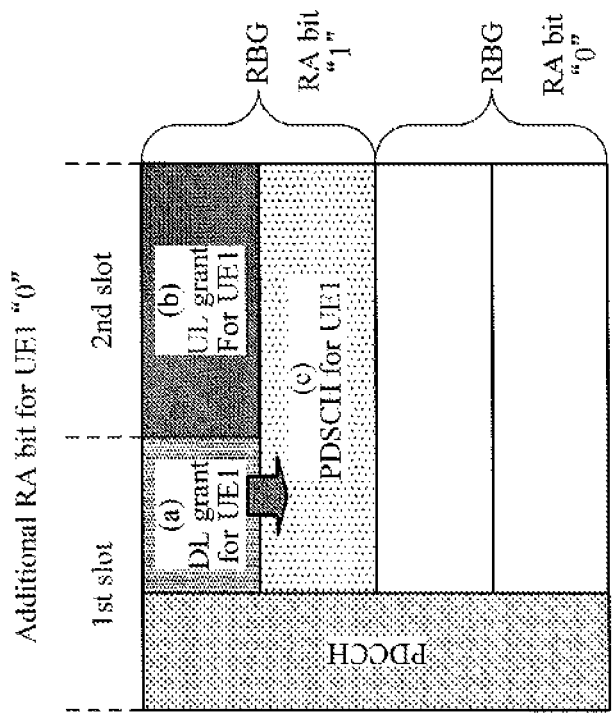
FIGS. 11A and B are diagrams provided for describing a data resource allocation method by additional bits.
Figure 11A:
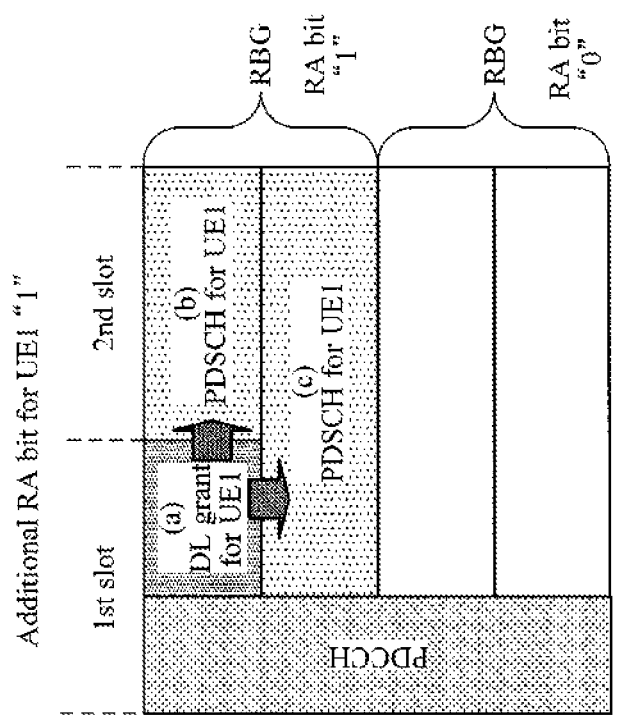

As a resource allocation method different from the resource allocation methods in Embodiments 1 and 2, there is a method that adds an additional bit (1 bit) other than the resource allocation bit to a DL grant and reports whether or not the 2nd slot of the PRB pair in which the DL grant is placed is used for the data resource region. That is, as shown in FIGS. 11A and B, when a DL grant is mapped to a region (a) of a given RBG, this additional bit can report whether the DL grant allocates regions (b) and (c) (FIG. 11A) or allocates only region (c) (FIG. 11B) to a PDSCH.

However, adding the additional bit to the DL grant is not desirable although the number of additional bits is small. This is because such a design change leads to an increase in the number of test man-hours. Thus, the present embodiment reports the antenna port to be used from a base station to a terminal instead of the additional bit and thereby reports whether or not to allocate region (b) to the data resource region.

Since the base station and the terminal according to Embodiment 3 are similar to base station 100 and terminal 200 according to Embodiment 1, the base station and the terminal will be described with reference to FIGS. 7 and 9.

In base station 100 according to Embodiment 3, transmission controlling section 102 determines a "mapping resource pattern to be used" of a control signal and a data signal based on a resource allocation bit and antenna port information and outputs the information on the determined mapping resource pattern to signal allocation section 106.

Figures 12A, 12B:
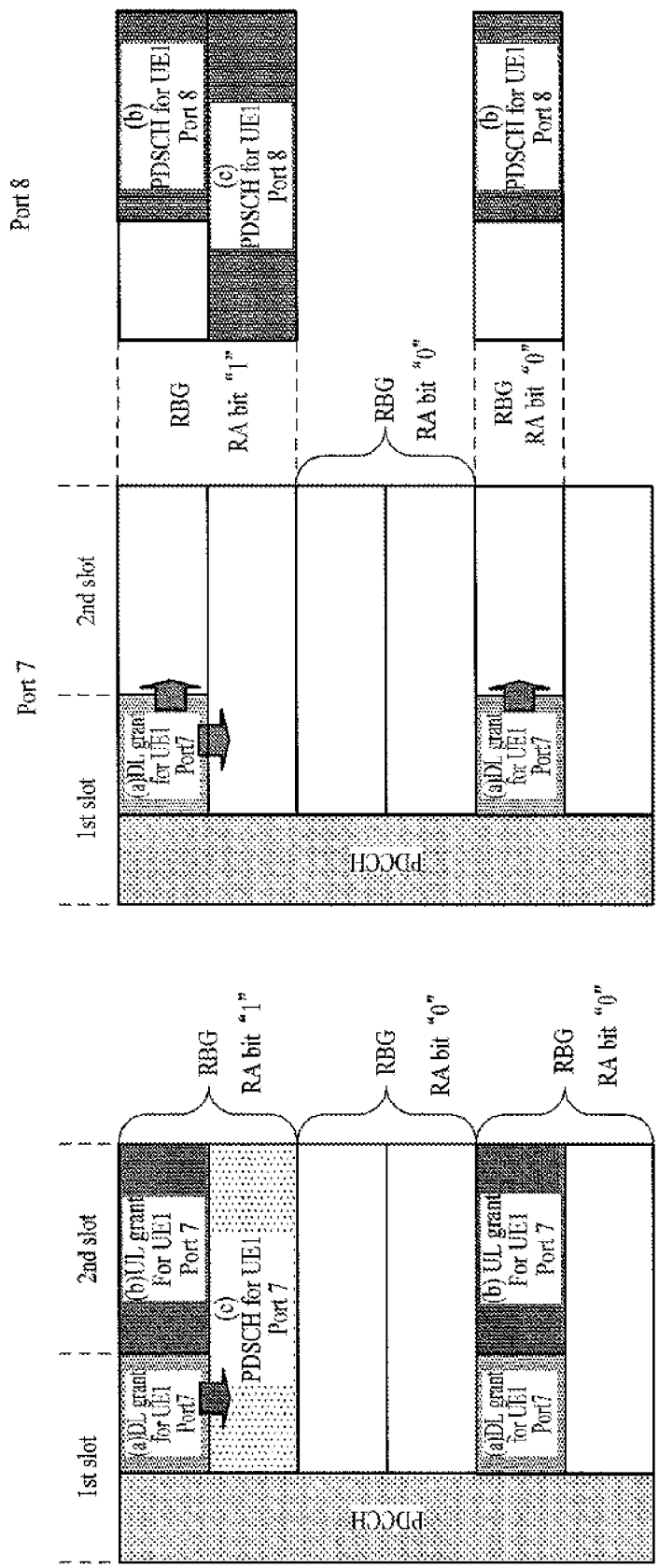
FIGS. 12A and B are diagrams provided for describing a mapping resource pattern used according to Embodiment 3.

To be more specific, when the value of the resource allocation bit is "1," the number of layers to be used is one and the antenna port to be used is a reference antenna port, transmission controlling section 102 determines mapping pattern 3 (see FIG. 12A) in which only region (c) is allocated to a data resource as the mapping resource pattern to be used. FIGS. 12A and B particularly show transmission subframes when RBG size M is 2. On the other hand, when the resource allocation bit is "1," the number of layers to be used is one and the antenna port to be used is a second antenna port other than a reference antenna port, transmission controlling section 102 determines mapping resource pattern 4 (see FIG. 12B) in which regions (b) and (c) except region (a) are allocated to data resources as the mapping resource pattern to be used.

On the other hand, when the resource allocation bit is 0, the number of layers to be used is one and the antenna port to be used is a second antenna port other than the reference antenna port, transmission controlling section 102 may determine mapping resource pattern 4 (see FIG. 12B) in which only region (c) except regions (a) and (b) is allocated to a data resource as the mapping resource pattern to be used.

In an RBG in which no DL grant is placed, if the value of the resource allocation bit is 0, the data resource region is never assigned to the RBG. Furthermore, in an RBG in which no DL grant is placed, if the value of the resource allocation bit is "1," the whole first resource region of the RBG (that is, all regions (a), (b) and (c)) are used as the data resource region.

Used pattern identifying section 210 in terminal 200 according to Embodiment 3 identifies the mapping resource pattern to be used, based on the antenna port information and the resource allocation bit included in the DL grant detected in control signal receiving section 205 and outputs the information on the identified mapping resource pattern to be used, to signal demultiplexing section 202. This mapping resource pattern to be used is the same as that used in base station 100.

Embodiment 4

Embodiment 4 uses an additional bit (1 bit) other than the resource allocation bit described above and switches a mapping resource pattern to be used when the number of layers to be used is one and the antenna port to be used is a second antenna port other than a reference antenna port, in accordance with the value of the additional bit.

Since the base station and the terminal according to Embodiment 4 are similar to base station 100 and terminal 200 according to Embodiment 1, the base station and the terminal will be described with reference to FIGS. 7 and 9.

In base station 100 of Embodiment 4, transmission controlling section 102 determines a "mapping resource pattern to be used" of a control signal and a data signal based on a resource allocation bit and antenna port information, and outputs information on the determined mapping resource pattern to signal allocation section 106.

Figures 13A, 13B:
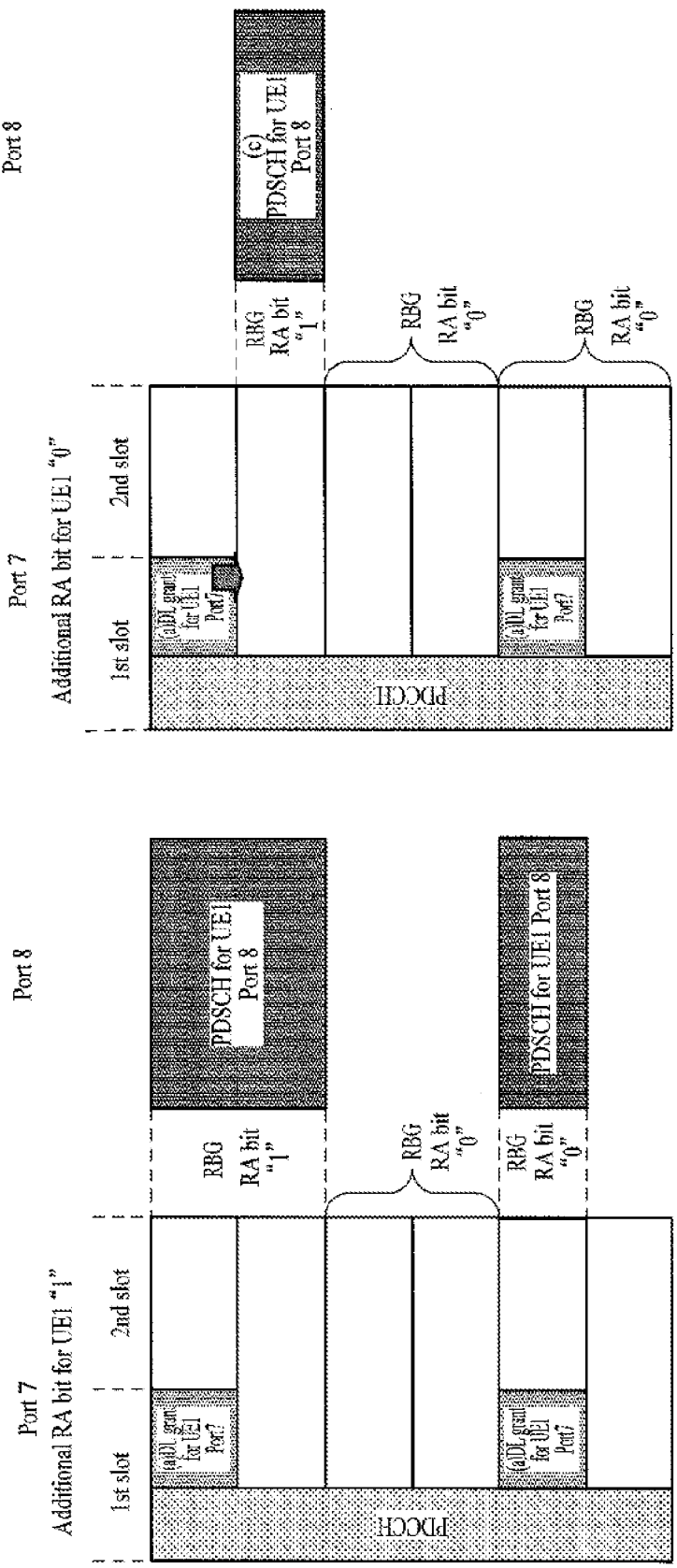
FIGS. 13A and B are diagrams provided for describing a mapping resource pattern used according to Embodiment 4.

To be more specific, when the resource allocation bit is 1, the number of layers to be used is one, the antenna port to be used is a second antenna port other than a reference antenna port and the value of the additional bit is "1," transmission controlling section 102 determines a mapping resource pattern 2 (see FIG. 13A) in which regions (a), (b) and (c) are all allocated to data resources as the mapping resource pattern to be used. FIGS. 13A and B particularly show a transmission subframe when RBG size M is 2. Furthermore, when the resource allocation bit is "1," the number of layers to be used is one, the antenna port to be used is a second antenna port other than a reference antenna port and the value of the additional bit is 0, transmission controlling section 102 determines mapping resource pattern 5 (see FIG. 13B) in which only region (c) is allocated to the data resource region as the mapping resource pattern to be used.

On the other hand, when the resource allocation bit is 0, the number of layers to be used is one, the antenna port to be used is a second antenna port other than a reference antenna port and the value of the additional bit is "1," transmission controlling section 102 determines mapping resource pattern 6 (see FIG. 13A) in which region (a) and region (b) are allocated to data resources as the mapping resource pattern to be used. When the resource allocation bit is 0, the number of layers to be used is one, the antenna port to be used is a second antenna port other than a reference antenna port and the value of the additional bit is 0, no data resource region is provided in the RBG in which a DL grant is placed (see FIG. 13B).

As described above, switching a mapping resource pattern in accordance with the additional bit makes it possible to switch between a pattern in which a DL grant and transmission data are multiplexed and a pattern in which these are not multiplexed.

Other Embodiments

[1] The technique described in Embodiment 2 is applicable to Embodiment 3 or 4. That is, transmission data making up a stream transmitted from an antenna port different from the antenna port used to transmit a DL grant and UL grant is not punctured and transmitted in the mapping resource pattern described in Embodiment 3 or 4. On the other hand, the transmission data which makes up a stream transmitted from the same antenna port as the antenna port used to transmit a DL grant and UL grant, and which is planned to be transmitted from the portion of the data resource region that overlaps with the control resource region is punctured.

[2] In the embodiments described above, a description has been given of the case where the allocation method is employed in which a region in an RBG other than the region to which the DL grant is mapped (i.e., region (a)) is allocated to PDSCH as PDSCH allocation by DL grant. The present invention, however, is not limited to this case, and allocation method described below may be applied.

(1) PDSCH Allocation Method 1 by DL Grant

Figures 14A, 14B:
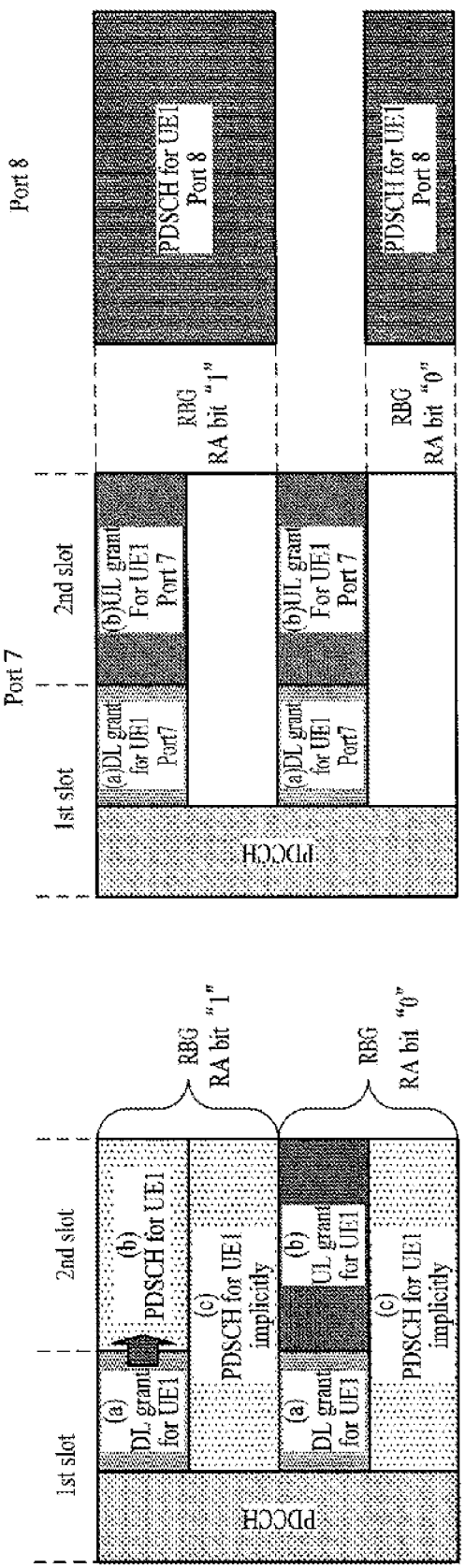
FIGS. 14A and B are diagrams provided for describing PDSCH allocation method 1 by DL grant.

FIGS. 14A and 14B are diagrams provided for describing PDSCH allocation method 1 by DL grant. As illustrated in FIG. 14A, when a resource allocation bit for the RBG is "1," region (b) is explicitly allocated as a data resource region by DL grant. Region (c) is implicitly allocated as a data resource region regardless of the value of the resource allocation bit. When the resource allocation bit for the RBG is "0," region (c) is allocated as a data resource region. In this way, even if a UL grant is to be transmitted, a PDSCH can be allocated to the RBG in which the DL grant is mapped.

When this PDSCH allocation method 1 is combined with Embodiment 1 or 2, the PDSCH resource region may need to be modified.

When the resource allocation bit is "1," as shown in FIG. 14B, PDSCH allocation method 1 can be combined with Embodiment 1 or 2 without modifying the resource region.

In contrast, when the resource allocation bit is "0," region (c) may be allocated to the data resource region as with FIG. 14A, or the data resource region may not be allocated to an RBG where a DL grant and UL grant are placed as with FIGS. 8A and B.

(2) PDSCH Allocation Method 2 by DL Grant

Figure 15B:
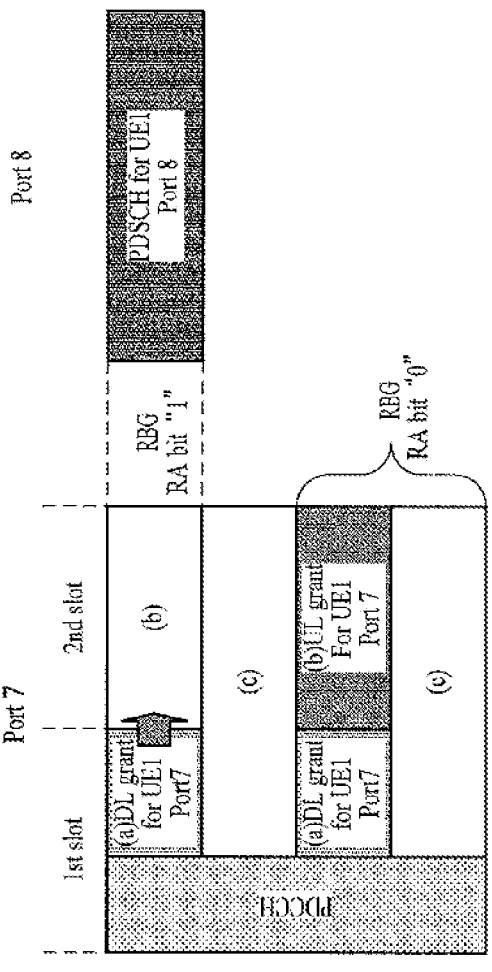
FIGS. 15A and B are diagrams provided for describing PDSCH allocation method 2 by DL grant.
Figure 15A:
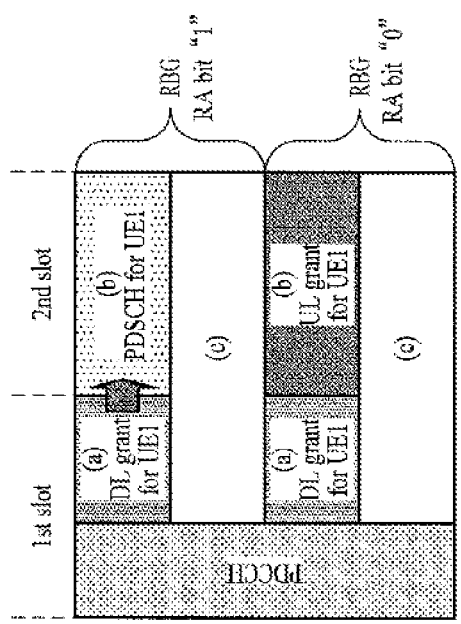

What is different from allocation method 1 is that region (c) is not allocated as a data resource (see FIG. 15A).

When this PDSCH allocation method 2 is combined with Embodiment 1 or 2, the PDSCH resource region may need to be modified.

More specifically, when the resource allocation bit is "1," as shown in FIG. 15B, if the number of layers to be used is one and the antenna port to be used is different from the antenna port used to transmit an allocation control signal, only regions (a) and (b) except region (c) are allocated as the data resource regions.

(3) PDSCH Allocation Method 3 by DL Grant

Figures 16A, 16B:
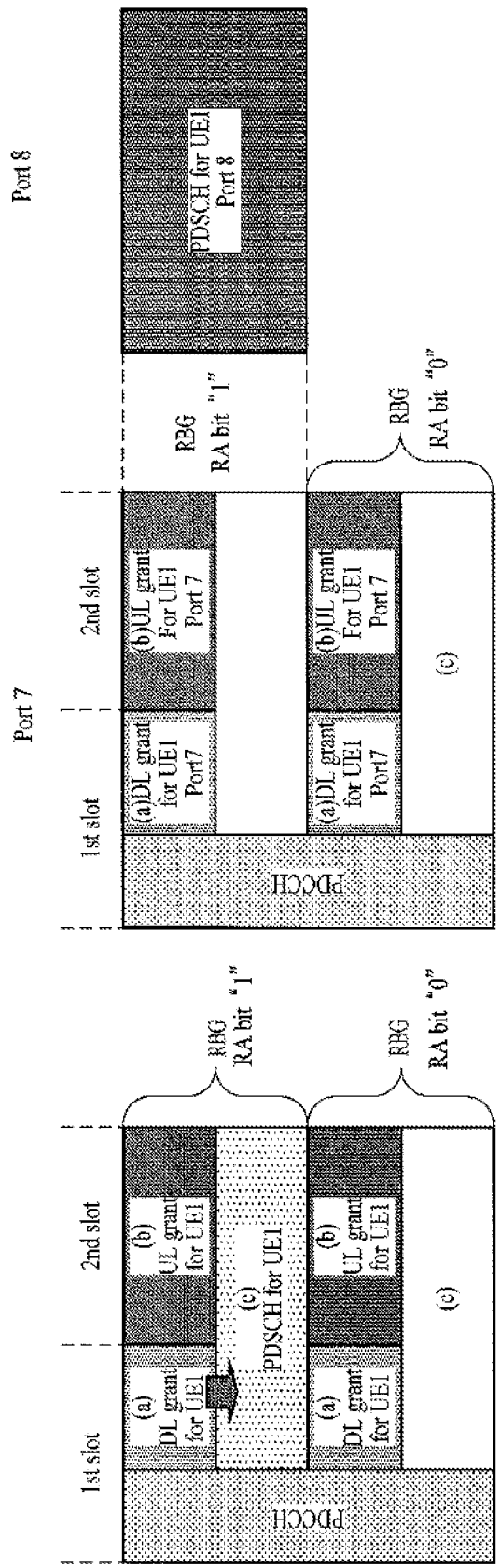
FIGS. 16A and B are diagrams provided for describing PDSCH allocation method 3 by DL grant.

What is different from PDSCH allocation method 1 by DL grant is that when the resource allocation bit is "1," only region (c) is used as a data resource (see FIG. 16A). When this PDSCH allocation method 3 is combined with Embodiment 1 or 2, no particular modification may need to be added. That is, when the number of layers to be used is one and the antenna port to be used is a second antenna port other than a reference antenna port, regions (a), (b) and (c) are all allocated to the data resource regions (see FIG. 16B).

(4) PDSCH Allocation Method 4 by DL Grant

Region (c) is divided into a first slot region (c-1) and a second slot region (c-2) in PDSCH allocation method 4.

Figures 17A, 17B:
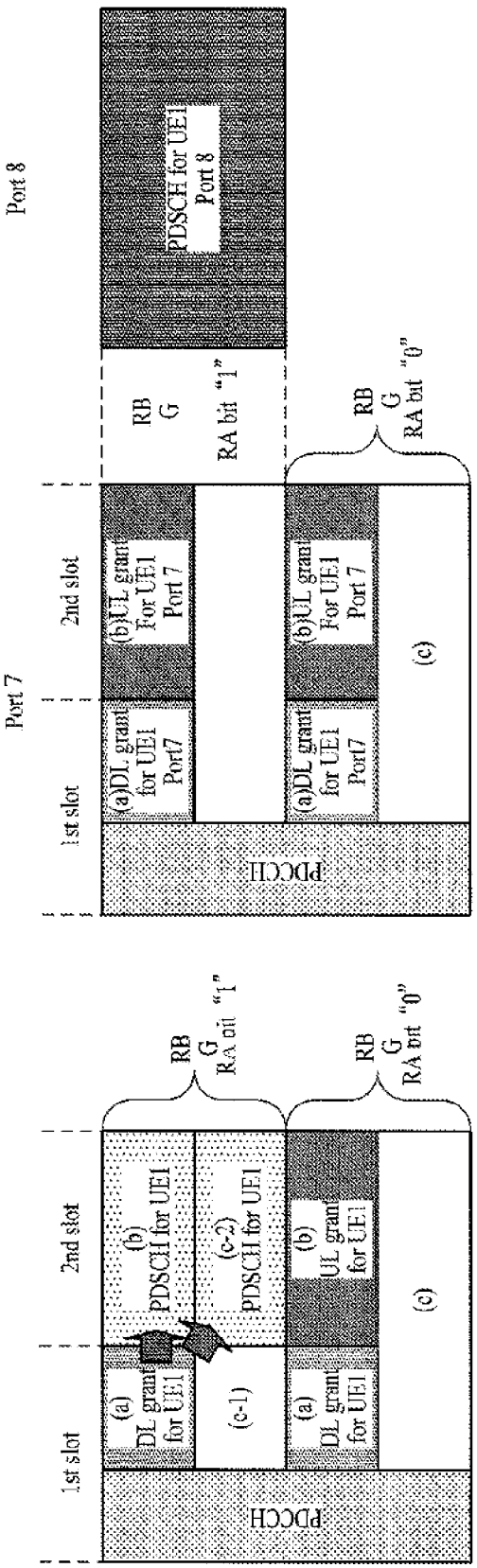
FIGS. 17A and B are diagrams provided for describing PDSCH allocation method 4 by DL grant.

FIGS. 17A and 17B are diagrams provided for describing PDSCH allocation method 4 by DL grant. As shown in FIG. 17A, regions (b) and (c-2) are allocated as data resources by DL grant when the resource allocation bit is "1," and the allocation is handled similarly to the case with PDSCH allocation method 2 by DL grant when the resource allocation bit is "0."

When this PDSCH allocation method 4 is combined with Embodiment 1 or 2, no particular modification may need to be added. That is, when the number of layers to be used is one and the antenna port to be used is a second antenna port other than a reference antenna port, regions (a), (b) and (c) are all allocated to the data resource regions (see FIG. 17B).

(5) PDSCH Allocation Method 5 by DL Grant

In PDSCH allocation method 5, a DL grant is located over a plurality of adjacent PRBs, as illustrated in FIG. 16A. Thus, region (b) includes a plurality of sub-regions in PRB units. The UL grant is mapped to part of the sub-regions. That is, in PDSCH allocation 5, the search space of DL grant differs from the search space of UL grant.

FIGS. 18A and 18B are diagrams provided for describing PDSCH allocation method 5 by DL grant. When the resource allocation bit is "1," regions (b-2) and (c) to which UL grant is not mapped is allocated as data resources by DL grant (see FIG. 18A). Furthermore, when the resource allocation bit is "0," all regions (a), (b) and (c) are excluded from the data resources.

When this PDSCH allocation method 5 is combined with Embodiment 1 or 2, no particular modification may need to be added. That is, when the number of layers to be used is "1" and the antenna port to be used is a second antenna port other than a reference antenna port, the whole first resource region of the RBG (i.e., all regions (a), (b) and (c)) is used as the data resource region (see FIG. 18B).

[3] In the embodiments described above, a DL grant is mapped in the first slot, and a UL grant is mapped in the second slot. That is, the resource to which the DL grant is mapped is separated from the resource to which the UL grant is mapped in the time domain. The present invention, however, is not limited thereto, and the resource to which the DL grant is mapped may be separated from the resource to which the UL grant is mapped in the frequency domain (i.e., subcarriers or PRB pairs).

(1) PDSCH Allocation Method 6 by DL Grant

Figure 19B:
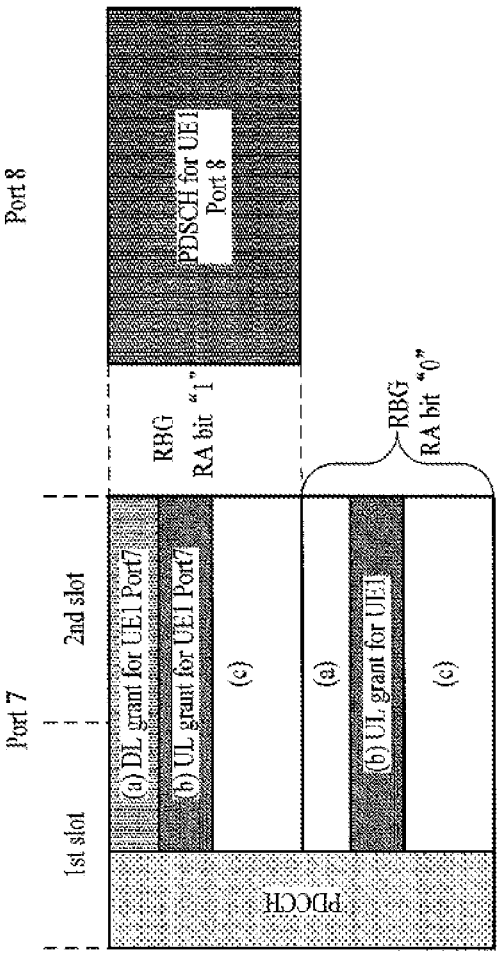
FIGS. 19A and B are diagrams provided for describing PDSCH allocation method 6 by DL grant.
Figure 19A:
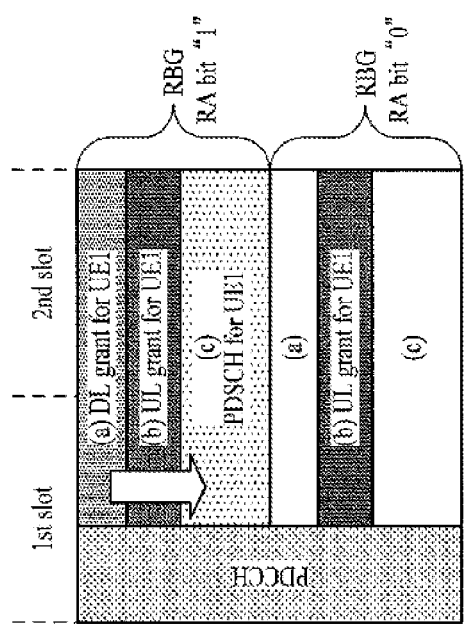

FIGS. 19A and B are provided for describing PDSCH allocation method 6. As illustrated in FIG. 19A, the plurality of subcarriers of the allocated PRB are divided into two subcarrier blocks. One of the two subcarrier blocks corresponds to region (a) to which DL grant is mapped. The other subcarrier block of the two subcarrier blocks corresponds to region (b) to which UL grant is mapped.

When the resource allocation bit is "1" in PDSCH allocation method 6, region (c) is used as the data resource, as illustrated in FIG. 19A, whereas region (c) is not used as the data resource when the resource allocation bit is "0."

In a case where PDSCH allocation method 6 is combined with Embodiment 1 or 2, no particular modification may need to be added. That is, when the number of layers to be used is one and the antenna port to be used is a second antenna port other than a reference antenna port, the whole first resource region of the RBG (i.e., all regions (a), (b) and (c)) is used as the data resource region (see FIG. 19B).

(2) PDSCH Allocation Method 7 by DL Grant

Figures 20A, 20B:
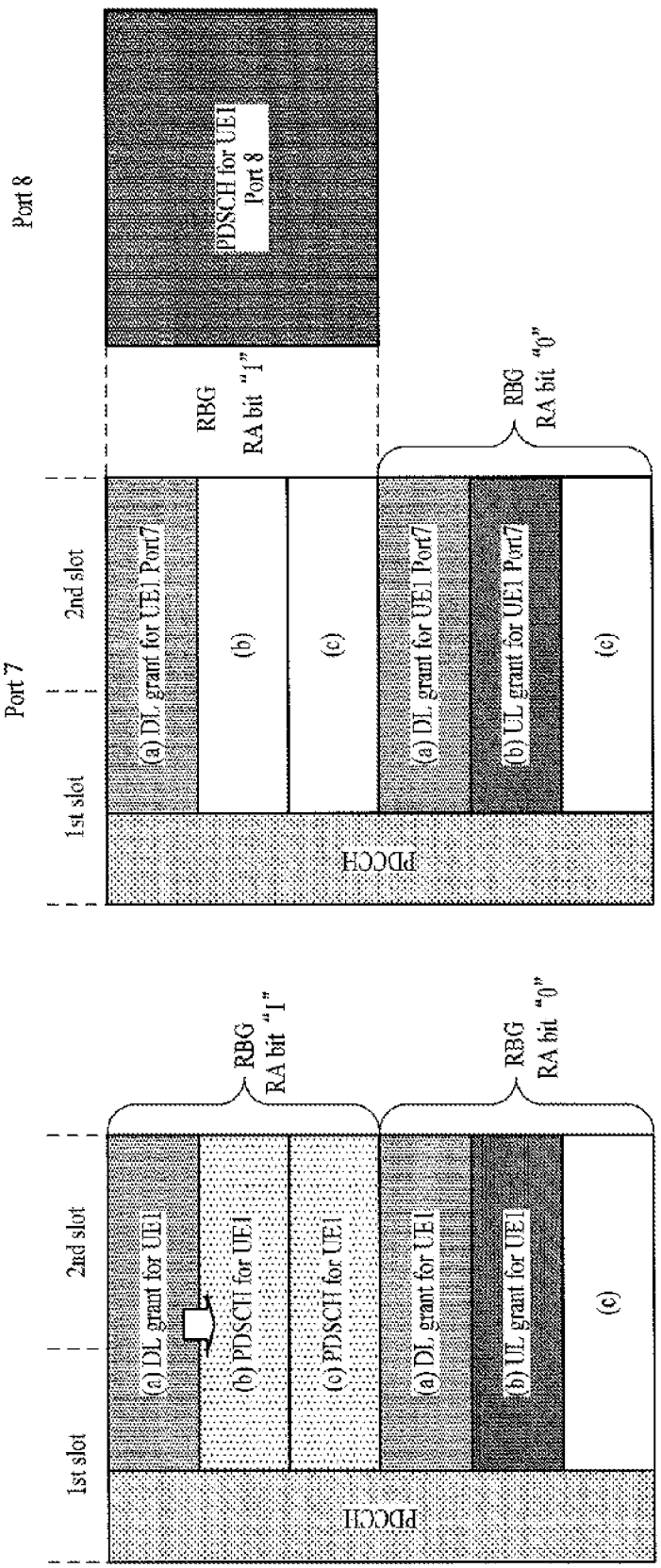
FIGS. 20A and B are diagrams provided for describing PDSCH allocation method 7 by DL grant.

FIGS. 20A and B are diagrams provided for describing PDSCH allocation method 7. As shown in FIG. 20A, a DL grant is mapped to region (a) except the PDCCH region in one PRB pair. Regions (b) and (c) except the PDCCH region in the other two PRB pairs are allocated as data resources by this DL grant.

In this PDSCH allocation method 7, when the resource allocation bit is "1," as shown in FIG. 20A, regions (b) and (c) are used as the data resources, whereas when the resource allocation bit is "0," region (c) is not used as the data resource.

When this PDSCH allocation method 7 is combined with Embodiment 1 or 2, no particular modification may need to be added. That is, when the number of layers to be used is one and the antenna port to be used is a second antenna port other than a reference antenna port, the whole first resource region of the RBG (i.e., all regions (a), (b) and (c)) is used as the data resource region (see FIG. 20B).

[4] The embodiments of the present invention described above are provided as hardware. The present invention can be achieved through software in cooperation with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-099473, filed on Apr. 27, 2011, including the specification, drawings and abstract is incorporated herein by reference in its entirety.

INDUSTRIAL APPLICABILITY

The transmitting apparatus, the receiving apparatus, the transmission method, and the reception method of the present invention are useful in that even when a first allocation control signal of a first data resource in a first communication direction and a second allocation control signal of a second data resource in a second communication direction in bidirectional communication are mapped within the same resource block group, they can increase the resource amount of the first data resource while avoiding collision between the second allocation control signal and a signal mapped to the first data resource in the resource block group.

REFERENCE SIGNS LIST

100 Base station
101 Antenna port determining section
102 Transmission controlling section
103 Control signal generating section
104, 206 Error-correction coding section
105, 207 Modulation section
106, 208 Signal allocation section
107, 209 Radio transmitting section
108, 201 Radio receiving section
109, 203 Demodulation section
110, 204 Error-correction decoding section
200 Terminal
202 Signal demultiplexing section
205 Control signal receiving section
210 Used pattern identifying section

The invention claimed is:

1. A transmitting apparatus that maps a control signal for a receiving apparatus to a first resource region usable for both a control channel and a data channel or a second resource region usable for a control channel and transmits the mapped control signal, and maps transmission data to a data resource region and transmits the mapped transmission data to the receiving apparatus, the transmitting apparatus comprising:
a generating section that generates an allocation control signal for the data resource region;
a setting section that sets a first data resource region within the first resource region in a resource block group (RBG) composed of M resource blocks (RBs), where M is a natural number equal to or greater than two, when the number of streams used to transmit the transmission data is one and an antenna port used to transmit the transmission data is identical to the antenna port used to transmit the allocation control signal, and
that sets a second data resource region larger than the first data resource region within the first resource region in the RBG when the number of streams used to transmit the transmission data is one and the antenna port used to transmit the transmission data is different from the antenna port used to transmit the allocation control signal; and
a mapping section that maps the transmission data to the set first data resource region or the set second data resource region, and maps the allocation control signal to a control resource region within the first resource region.

2. The transmitting apparatus according to claim 1, wherein the second data resource region is the whole first resource region in the RBG.

3. The transmitting apparatus according to claim 1, wherein:
the setting section sets the data resource region over the whole first resource region in the RBG so as to overlap with the control resource region within the first resource region, when the number of streams is equal to or greater than two; and
the mapping section punctures, when the number of streams is equal to or greater than two, the transmission data which forms a stream transmitted from the identical antenna port used to transmit the allocation control signal and which corresponds to a portion of the data resource region that overlaps with the control resource region within the first resource region, and then maps the transmission data to a portion of the data resource region that does not overlap with the control resource region.

4. The transmitting apparatus according to claim 1, wherein:
a region of the RBG excluding the second resource region includes: a first region that is set as the control resource region within the first resource region; a second region that is a region excluding the first region in an RB including the first region; and a third region formed of an RB other than the RB including the first region and the second region;
the first data resource region is formed of the third region; and
the second data resource region is formed of the second region and the third region.

5. The transmitting apparatus according to claim 1, wherein the setting section switches the size of the second data resource region.

6. A receiving apparatus that receives a received signal including a control signal transmitted from a transmitting apparatus in a first resource region usable for both a control channel and a data channel or a second resource region usable for a control channel, and receives transmission data mapped to the first data resource region or the second data resource region and transmitted from the transmitting apparatus, the receiving apparatus comprising:
a detection section that detects an allocation control signal for the data resource region included in the received signal;
an identifying section that identifies a first data resource region within the first resource region in a resource block group (RBG) composed of M resource blocks (RBs), where M is a natural number equal to or greater than two, as a data component region to be extracted, when the number of streams used to transmit the transmission data is one and an antenna port used to transmit the transmission data is identical to the antenna port used to transmit the allocation control signal; and
the identifying section that identifies a second data resource region larger than the first data resource region within the first resource region in the RBG as the data component region to be extracted, when the number of streams used to transmit the transmission data is one and the antenna port used to transmit the transmission data is different from the antenna port used to transmit the allocation control signal; and an extracting section that extracts from the received signal, a signal component within the identified data component region to be extracted.

7. The receiving apparatus according to claim 6, wherein the second data resource region is the whole first resource region in the RBG.

8. The receiving apparatus according to claim 6, wherein:
a region of the RBG excluding the second resource region includes: a first region that is set as a control resource region within the first resource region; a second region that is a region excluding the first region in an RB including the first region; and a third region formed of an RB other than the RB including the first region and the second region;
the first data resource region is formed of the third region; and
the second data resource region is formed of the second region and the third region.

9. The receiving apparatus according to claim 6, wherein the identifying section switches the size of the second data resource region in accordance with a switching instruction bit transmitted from the transmitting apparatus.

10. A transmission method that maps a control signal for a receiving apparatus to a first resource region usable for both a control channel and a data channel or a second resource region usable for a control channel, then transmits the mapped control signal, and maps transmission data to a data resource region and transmits the mapped transmission data to the receiving apparatus, the method comprising:
generating an allocation control signal for the data resource region;
setting a first data resource region within the first resource region in a resource block group (RBG) composed of M resource blocks (RBs), where M is a natural number equal to or greater than two, when the number of streams used to transmit the transmission data is one and an antenna port used to transmit the transmission data is identical to the antenna port used to transmit the allocation control signal;
setting a second data resource region larger than the first data resource region within the first resource region in the RBG when the number of streams used to transmit the transmission data is one and the antenna port used to transmit the transmission data is different from the antenna port used to transmit the allocation control signal; and
mapping the transmission data to the set first data resource region or the set second data resource region, and mapping the allocation control signal to a control resource region within the first resource region.

11. A reception method that receives a received signal including a control signal transmitted from a transmitting apparatus in a first resource region usable for both a control channel and a data channel or a second resource region usable for a control channel, and receives transmission data mapped to the first data resource region or the second data resource region and transmitted from the transmitting apparatus, the method comprising:
detecting an allocation control signal for the data resource region included in the received signal;
identifying a first data resource region within the first resource region in a resource block group (RBG) composed of M resource blocks (RBs), where M is a natural number equal to or greater than two, as a data component region to be extracted, when the number of streams used to transmit the transmission data is one and an antenna port used to transmit the transmission data is identical to the antenna port used to transmit the allocation control signal;
identifying a second data resource region larger than the first data resource region within the first resource region in the RBG as the data component region to be extracted, when the number of streams used to transmit the transmission data is one and the antenna port used to transmit the transmission data is different from the antenna port used to transmit the allocation control signal; and
extracting, from the received signal, a signal component within the identified data component region to be extracted.

* * * * *